(12) United States Patent
Konishi

(10) Patent No.: US 9,513,996 B2
(45) Date of Patent: Dec. 6, 2016

(54) INFORMATION PROCESSING APPARATUS, COMPUTER-READABLE RECORDING MEDIUM HAVING STORED PROGRAM FOR CONTROLLING INFORMATION PROCESSING APPARATUS, AND METHOD FOR CONTROLLING INFORMATION PROCESSING APPARATUS

(71) Applicant: FUJITSU LIMITED, Kawasaki-shi, Kanagawa (JP)

(72) Inventor: Yotaro Konishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/269,878

(22) Filed: May 5, 2014

(65) Prior Publication Data

US 2014/0380091 A1    Dec. 25, 2014

(30) Foreign Application Priority Data

Jun. 19, 2013 (JP) ................................ 2013-128606

(51) Int. Cl.
 *G06F 11/00* (2006.01)
 *G06F 11/10* (2006.01)
(52) U.S. Cl.
 CPC ................................ *G06F 11/1088* (2013.01)

(58) Field of Classification Search
 CPC .............. G06F 11/1088; G06F 11/1076; G06F 11/1471; G06F 11/3476; G06F 11/30; G06F 11/34
 See application file for complete search history.

(56) References Cited

U.S. PATENT DOCUMENTS

| 7,516,352 B2 | 4/2009 | Elliott et al. | |
| 8,874,956 B2* | 10/2014 | Olster | G06F 11/2082 714/6.1 |
| 2003/0158966 A1 | 8/2003 | Sato | |
| 2008/0263393 A1* | 10/2008 | Shirogane | G06F 11/1088 714/6.32 |
| 2012/0254508 A1* | 10/2012 | Walls | G06F 11/2087 711/103 |

FOREIGN PATENT DOCUMENTS

| JP | 2002-7304 | 1/2002 |
| JP | 2003-241900 | 8/2003 |
| JP | 2007-257633 | 10/2007 |

* cited by examiner

*Primary Examiner* — Bryce Bonzo
*Assistant Examiner* — Katherine Lin
(74) *Attorney, Agent, or Firm* — Fujitsu Patent Center

(57) ABSTRACT

A control device controls the switch device and the plurality of processing apparatuses such that, when one of replicated data pieces stored in two or more different storage devices among the plurality of storage devices is lost, the replicated data piece stored in a second storage device other than a first storage device storing lost replicated data piece among the two or more different storage devices is copied through the switch device to reconstruct the lost replicated data piece. Thus, a redundancy of replicated data is restored without affecting a bandwidth of a network.

11 Claims, 39 Drawing Sheets

FIG. 9

ZONING SETTING OF SAS EXPANDER ILLUSTRATED IN FIG. 8

| ZONE ID | PHY |
|---------|-----|
| Z1 | 51a; 52a, 52b, 52c |
| Z2 | 51b; 52d, 52e, 52f |
| Z3 | 51c; 52g, 52h, 52i |
| Z4 | 52j, 52k, 52l |

FIG. 13

T1: DEVICE MANAGEMENT TABLE

| devID | driveID | MOUNT POINT | SERVER IP ADDRESS |
|---|---|---|---|
| dev0 | 0-0-0-0 | /mnt/0-0-0-0 | 192.168.1.1 |
| dev1 | 0-0-0-3 | /mnt/0-0-0-3 | 192.168.1.2 |
| dev2 | 0-0-0-6 | /mnt/0-0-0-6 | 192.168.1.3 |
| ... | | | |
| devZ | x-x-x-x | | |

T2: REPLICA MANAGEMENT TABLE

| (UPPER n bits OF) OBJECT HASH VALUE | REPLICA #1 | REPLICA #2 | REPLICA #3 |
|---|---|---|---|
| 00001 | dev0 | dev1 | *dev2* |
| 00002 | dev3 | dev4 | *dev2* |
| 00003 | dev5 | dev4 | dev1 |
| .... | | | |
| 00010 | *dev2* | | |
| 00011 | | | |
| .... | | | |
| FFFFF | devX | devY | devZ |

00001 0000...0000
00001 0000...0001
....
00001 FFFF...FFFE
00001 FFFF...FFFF

FIG. 15

T3: SERVER/DRIVE CONNECTION TABLE

| serverID | driveID |
|---|---|
| 0 | 0-0-0-0, 0-0-0-1 |
| 1 | 0-0-0-3, 0-0-0-4 |
| 2 | 0-0-0-6, 0-0-0-7 |
| ... | ... |
| N | x-x-x-x |
| FREE | 0-0-1-0, 0-0-1-1, 0-0-1-2,... |

FIG. 20

T3: SERVER/DRIVE CONNECTION TABLE

| serverID | driveID | | |
|---|---|---|---|
| 0 | 0-0-0-0 | 0-0-0-1 | |
| 1 | A12 | 0-0-0-3, 0-0-0-4 | |
| 2 | | 0-0-0-6, 0-0-0-7 | |
| ... | | | |
| N | | x-x-x-x | |
| FREE | | 0-0-1-0, 0-0-1-1, 0-0-1-2, ... | |

DELETE (S14)

FIG. 32

| serverID | driveID | | | |
|---|---|---|---|---|
| 0 | 0-0-0-0, 0-0-0-1 | | | |
| 1 | 0-0-0-3, 0-0-0-4 | 0-0-1-1 | | |
| 2 | 0-0-0-6, 0-0-0-7 | 0-0-1-2 | | |
| ... | X-X-X-X | | | |
| N | | | | |
| FREE | 0-0-1-0,... | | | |

A27

T3: SERVER/DRIVE CONNECTION TABLE

| serverID | driveID | | |
|---|---|---|---|
| 0 | 0-0-1-0 | 0-0-0-1, 0-0-0-1-1, 0-0-0-1-2 | |
| 1 | 0-0-0-3, 0-0-0-4 | | |
| 2 | 0-0-0-6, 0-0-0-7 | | |
| ... | | | |
| N | X-X-X-X | | |
| FREE | | | |

A29

| driveID | ATTRIBUTE |
|---|---|
| 0-0-0-0 | HDD |
| 0-0-0-1 | HDD |
| ... | |
| 0-0-1-0 | HDD |
| ... | |
| X-X-X-X | |

FREE

T4: DRIVE ATTRIBUTE TABLE

| devID | driveID |
|---|---|
| dev0 | 0-0-0-0, 0-0-0-1-0 |
| dev1 | 0-0-0-1 |
| dev2 | 0-0-0-2 |
| ... | |
| devZ | X-X-X-X |

A30

T1: DEVICE MANAGEMENT TABLE

FIG. 36

T3: SERVER/DRIVE CONNECTION TABLE

| serverID | driveID |
|---|---|
| 0 | 0-0-0-1, 0-0-1-0 |
| 1 | 0-0-0-3, 0-0-0-4 |
| 2 | 0-0-0-6, 0-0-0-7 |
| ... | x-x-x-x |
| N | x-x-x-x |
| FREE | 0-0-1-1, 0-0-1-2... |

INFORMATION PROCESSING APPARATUS, COMPUTER-READABLE RECORDING MEDIUM HAVING STORED PROGRAM FOR CONTROLLING INFORMATION PROCESSING APPARATUS, AND METHOD FOR CONTROLLING INFORMATION PROCESSING APPARATUS

CROSS-REFERENCE TO RELATED APPLICATION

This application is based upon and claims the benefit of priority of the prior Japanese Application No. 2013-128606 filed on Jun. 19, 2013 in Japan, the entire contents of which are hereby incorporated by reference.

FIELD

The present invention relates to an information processing apparatus, a computer-readable recording medium having a stored program for controlling an information processing apparatus, and a method for controlling an information processing apparatus.

BACKGROUND

In an object storage system including a plurality of servers (a server cluster), actual data (object) is transmitted between a user or a web application and each server via a network.

For example, in an object storage system illustrated in FIG. 37, the user transmits or receives actual data (object) to or from a server group including a plurality of servers 300A to 300D (four servers in FIG. 37) through a network 100 such as the Internet or a local area network (LAN) and a gateway 200. In the following description, when one of the servers is specified, one of reference numerals 300A to 300D is used, but when an arbitrary server is designated, a reference numeral 300 is used. As a storage place of actual data, a disk drive (hard disk drive (HDD)) (see reference numerals 303a to 303c in FIGS. 38 and 39) equipped in each server 300 is used.

At this time, as a counter-measure against a drive failure, a replica that is a replicated data piece of the same object is stored in HDDs of a plurality of different servers 300 in order to prevent an object from being lost when a drive failure occurs. A certain replica number of the same object stored in the object storage system is referred to as a "multiplicity" or "redundancy" of a replica. FIG. 37 illustrates an example in which a replica multiplicity is 3.

A gateway (front end server) 200 interposed between the network 100 and the server group generates a certain number (3 in FIG. 37) of replicas on an object when a write access of an object or the like is received from the user. Further, the gateway 200 distributedly arranges and stores the certain number of generated replicas in the different servers 300A to 300C.

Next, processing when a drive failure occurs in the object storage system illustrated in FIG. 37 will be described with reference to FIGS. 38 and 39. Each server 300 is connected to the LAN 100, and includes a central processing unit (CPU) 301, a memory 302, and a plurality of HDDs 303a to 303c (three HDDs in FIG. 38) as illustrated in FIGS. 38 and 39. The actual data (object) accessed by the user is stored in the HDDs 303a to 303c of each server 300. The memory 302 of each server 300 stores various kinds of data, programs, and the like for processing of the CPU 301, and temporarily stores an object to be stored in the HDDs 303a to 303c. In FIGS. 38 and 39, the gateway 200 illustrated in FIG. 37 is not illustrated.

First, three replicas (refer to a star in FIG. 38) of the same object are stored in the HDD 303a of the server 300A, the HDD 303b of the server 300B, and the HDD 303c of the server 300C, respectively, as illustrated in FIG. 38. At this time, the HDD 303a of the server 300A is assumed to be faulty as illustrated in FIG. 39. In this case, the object stored in the HDD 303a of the server 300A is lost, the replica number (multiplicity or redundancy) of the object in the system is reduced from 3 to 2. For this reason, the replica number of the object is restored to a certain number (here, 3) before the replica number of the object becomes zero (0).

In this regard, at least one of the server 300B and the server 300C having the replica of the object transmits the replica in the HDDs 303b or 303c to the server 300A via the LAN 100 as indicated by an arrow A1 or A2 in FIG. 39, and copies the replica of the object to the server 300A. As a result, the replica number of the object in the system is restored to the certain number, that is, 3. A specific means for selecting, for example, a server or a HDD in which a replica is to be transmitted at the time of the replica number restoration process depends on an implementation.

Here, the restoration process speed of the replica number is not allowed to exceed the band of the LAN 100. When the user writes or reads an object during the replica number restoration process, it competes with the restoration process. At this time, when the user process is given a priority, the speed of the restoration process decreases, and when the restoration process is given a priority, the speed of the user process decreases.

As a related art, a technique of performing a backup process from a disk to a tape via a storage area network (SAN) without using a LAN has been known (see JP 2002-007304A). However, this technique aims to simply increase the speed of the backup process from the disk to the tape, and does not related to a replica number restoration process in an environment in which a certain number of replicas (replicated data pieces) of the same data are distributedly arranged in a certain number of servers (HDDs).

In a storage system including a server cluster, a bandwidth of a LAN connecting servers with one another serves a bottle neck of processing performance. For this reason, when a drive failure occurs and so the replica number restoration process is performed using a LAN between servers as described above, the restoration process speed is limited. Thus, when a processing request of a system user becomes a high load during the restoration process, the restoration process hinders the user process, or vice versa.

SUMMARY

An information processing apparatus of the present disclosure includes a plurality of storage devices, a plurality of processing apparatuses, a switch device that switches a connection state between the plurality of storage devices and the plurality of processing apparatuses, and a control device that controls the switch device and the plurality of processing apparatuses. The control device controls the switch device and the plurality of processing apparatuses such that, when one of replicated data pieces stored in two or more different storage devices among the plurality of storage devices is lost, the replicated data piece stored in a second storage device other than a first storage device storing lost replicated data piece among the two or more different storage devices is copied through the switch device to reconstruct the lost replicated data piece.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 9 is a diagram for describing an SAS zoning setting in an SAS expander illustrated in FIG. 8;

FIG. 13 is a diagram for describing in a device management table in the object storage system according to the present embodiment;

FIG. 15 is a diagram for describing a server/drive connection table in the object storage system according to the present embodiment;

FIGS. 19 and 20 are flowcharts for describing a replica redundancy restoration process (faulty drive disconnection process) performed by the object storage system according to the present embodiment;

FIGS. 31 and 32 are diagrams for describing a replica redundancy restoration process (an SSD movement process and a backup HDD addition process) performed by the object storage system according to the present embodiment;

FIGS. 34 to 36 are diagrams for describing a replica redundancy restoration process (a process of copying a replica to a backup HDD) performed by the object storage system according to the present embodiment;

DESCRIPTION OF THE PREFERRED EMBODIMENTS

Figure 1:
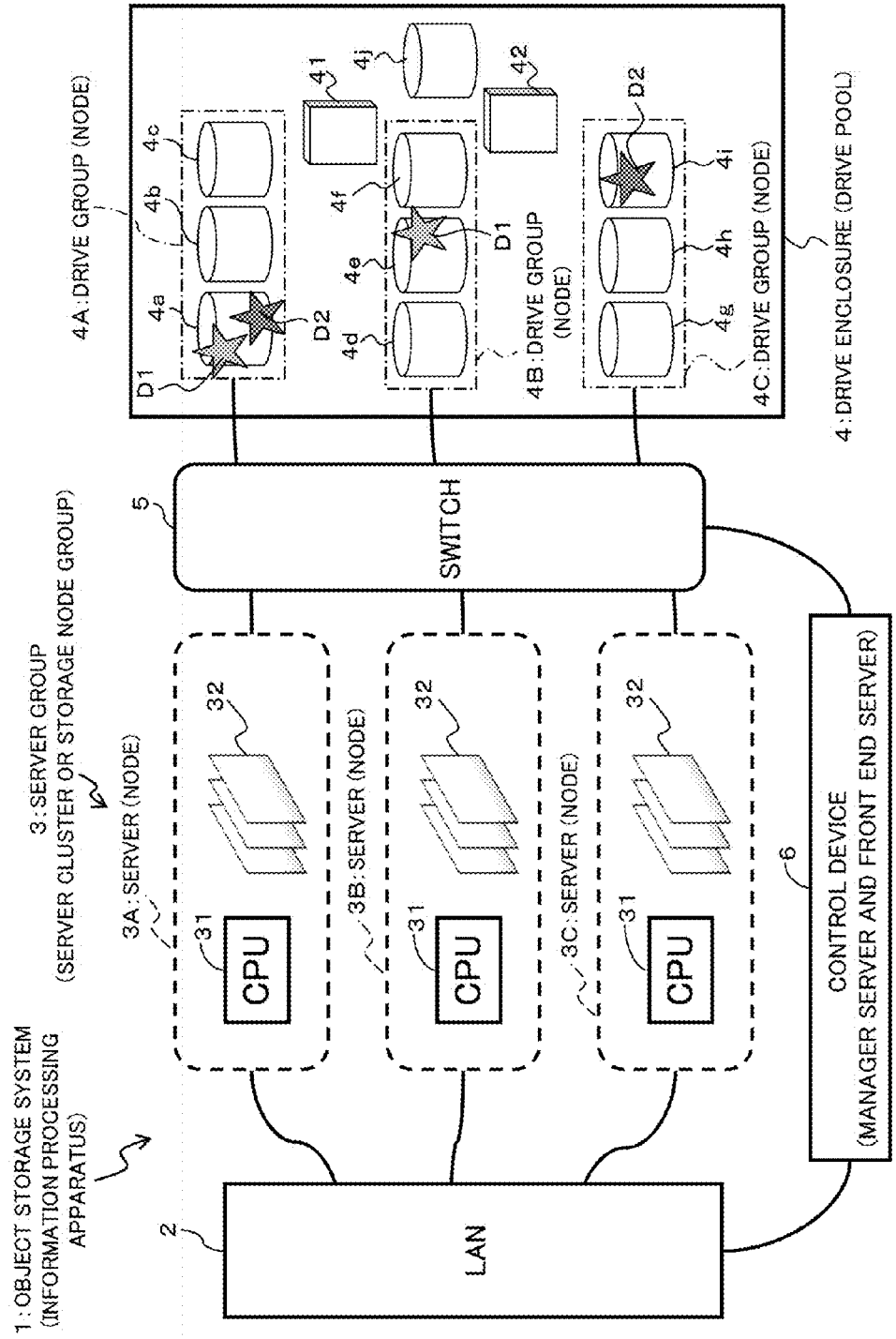
FIGS. 1 to 6 are diagrams for describing a configuration of an object storage system (information processing apparatus) and an outline of a replica redundancy restoration process according to the present embodiment.

Hereinafter, exemplary embodiments will be described with reference to the appended drawings.

[1] Configuration of Object Storage System and Outline of Replica Redundancy Restoration Process According to Present Embodiment First, a configuration of an object storage system (information processing apparatus) 1 and an outline of a replica redundancy restoration process according to the present embodiment will be described with reference to FIGS. 1 to 6.

The object storage system (information processing apparatus) 1 according to the present embodiment includes a LAN 2, a server group 3, a drive enclosure 4, a drive connection selector switch 5, and a control device 6 as illustrated in FIGS. 1 to 6.

The LAN 2 is a network such as the Ethernet (a registered trademark), and connects servers 3A to 3C configuring the server group 3 with one another and connects the server group 3 with the control device 6 so that communication can be performed therebetween.

The server group (a server cluster or a storage node group) 3 includes a plurality of servers (nodes or processing apparatuses) 3A to 3C. The server group 3 illustrated in FIGS. 1 to 6 includes the three servers 3A to 3C but may include four or more servers. Each of the servers 3A to 3C of the present embodiment includes a CPU (processing unit) 31 and a memory 32. Storage devices (drives) 4a to 4j, 41, and 42 used by the servers 3A to 3C are aggregated into a drive pool (drive enclosure) 4. The memory 32 stores various kinds of data, various kinds of programs, and the like which are necessary for processing of the CPU 31, and temporarily stores objects to be stored in the storage devices 4a to 4j, 41, and 42. Further, various kinds of storage devices such as a random access memory (RAM), a HDD, or a solid state drive (SSD) may be used as the memory 32.

Various kinds of drives (for example, a HDD and an SSD) may be mounted in the drive pool 4 together. Further, the drive pool 4 is configured so that many drives can be stored, and an extra drive (third storage device) for a backup can be mounted as well. In the present embodiment, the ten HDDs 4a to 4j and the two SSDs 41 and 42 are equipped as the drives, but the present invention is not limited to the number of drives. Further, in the present embodiment, the HDD 4j is equipped as the extra drive, but two or more HDDs may be equipped as an extra drive. Further, in the present embodiment, the SSDs 41 and 42 are used as a storage device for data replication which will be described later, but three or more SSDs may be equipped as a storage device for data replication.

A drive connection selector switch (switch device) 5 switches a connection state between the plurality of storage devices 4a to 4j, 41, and 42 and a plurality of CPU 3A to 3C, and is configured with, for example, an SAS expander which will be described later with reference to FIGS. 8 and 9. The switch 5 is controlled by a function of a manager server of the control device 6 which will be described later. As the switch 5 switches the connection state, each of the servers 3A to 3C can exclusively access any one of the storage devices 4a to 4j, 41, and 42.

In the example illustrated in FIG. 1, one node including the server 3A and the drive group 4A is configured such that the drive group 4A including the three HDDs 4a to 4c are connected to the server 3A by the switch 5. Further, one node including the server 3B and the drive group 4B is configured such that the drive group 4B including the three HDDs 4d to 4f are connected to the server 3B by the switch 5. Furthermore, one node including the server 3C and the drive group 4C is configured such that the drive group 4C including the three HDDs 4g to 4i are connected to the server 3C by the switch 5.

As a result, the server 3A and the HDDs 4a to 4c are managed as one node, and objects accessed through the server 3A are stored in the HDDs 4a to 4c. Further, the server 3B and the HDDs 4d to 4f are managed as one node, and objects accessed through the server 3B are stored in the HDDs 4d to 4f. Further, the server 3C and the HDDs 4g to 4i are managed as one node, and objects accessed through the server 3C are stored in the HDDs 4g to 4i. At this time, the HDD 4j used as an extra drive for a backup and the SSDs 41 and 42 used for data copy are not connected to any of the servers 3A to 3C, that is, in the disconnected state.

The control device 6 is connected to perform communication with the switch 5 via a universal serial bus (USB), connected to perform communication with the servers 3A to 3C (the CPUs 31) via the LAN 2, and controls the switch 5 and the servers 3A to 3C (the CPUs 31). The control device 6 controls the switch 5 and the servers 3A to 3C (the CPUs 31) and functions as a manager server that performs a replica redundancy restoration process which will be described later. Further, the control device 6 has a function of a front end server accessing a corresponding object in the drive groups 4A to 4C through the LAN 2 and the servers 3A to 3C according to access from the user.

At this time, in the present object storage system 1, as a counter-measure against a drive failure, a replica that is a replicated data piece of the same object is stored in HDDs of a plurality of different servers in order to prevent an object from being lost when a drive failure occurs. FIGS. 1 to 6 illustrate an example in which a replica redundancy (multiplicity) is 2. In other words, the front end server function of the control device 6 generate two replicas on a corresponding object and distributedly arranges the generated replicas in two HDDs belonging to different drive groups. Through this operation, in the example illustrated in FIG. 1, two replicas (replicated data pieces) D1 and D1 of a certain object are distributedly arranged in the HDDs 4a and 4e, and two replicas (replicated data pieces) D2 and D2 of another object are distributedly arranged in the HDDs 4a and 4i.

Further, the manager server function of the control device 6 performs a process of restoring the replica redundancy when one of the replicas is lost and the replica redundancy is reduced from 2 to 1. In other words, the control device 6 controls the switch 5 and the CPUs 31 of the servers 3A to 3C such that a corresponding replica from the HDDs (second storage devices) 4e and 4i storing the corresponding replica other than the HDD (first storage device) 4a that has stored the lost replica is copied through the switch 5, and the lost replica is reconstructed in the drive group 4A. At this time, for example, the control device 6 copies the replicas D1 and D2 stored in the HDDs 4e and 4i to the HDD (third storage device) 4j other than the HDD 4a through the switch 5.

Figure 2:
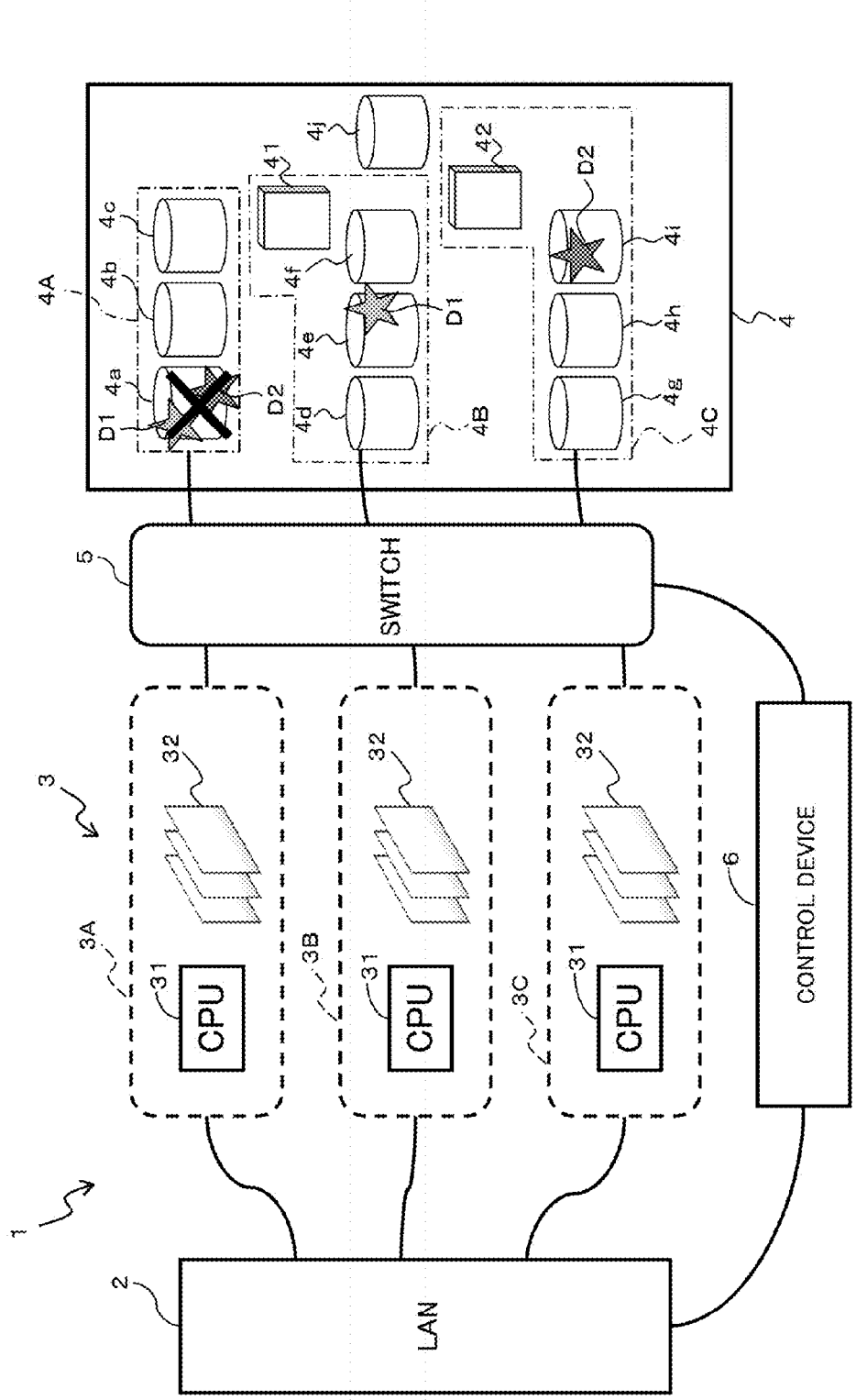
Figure 3:
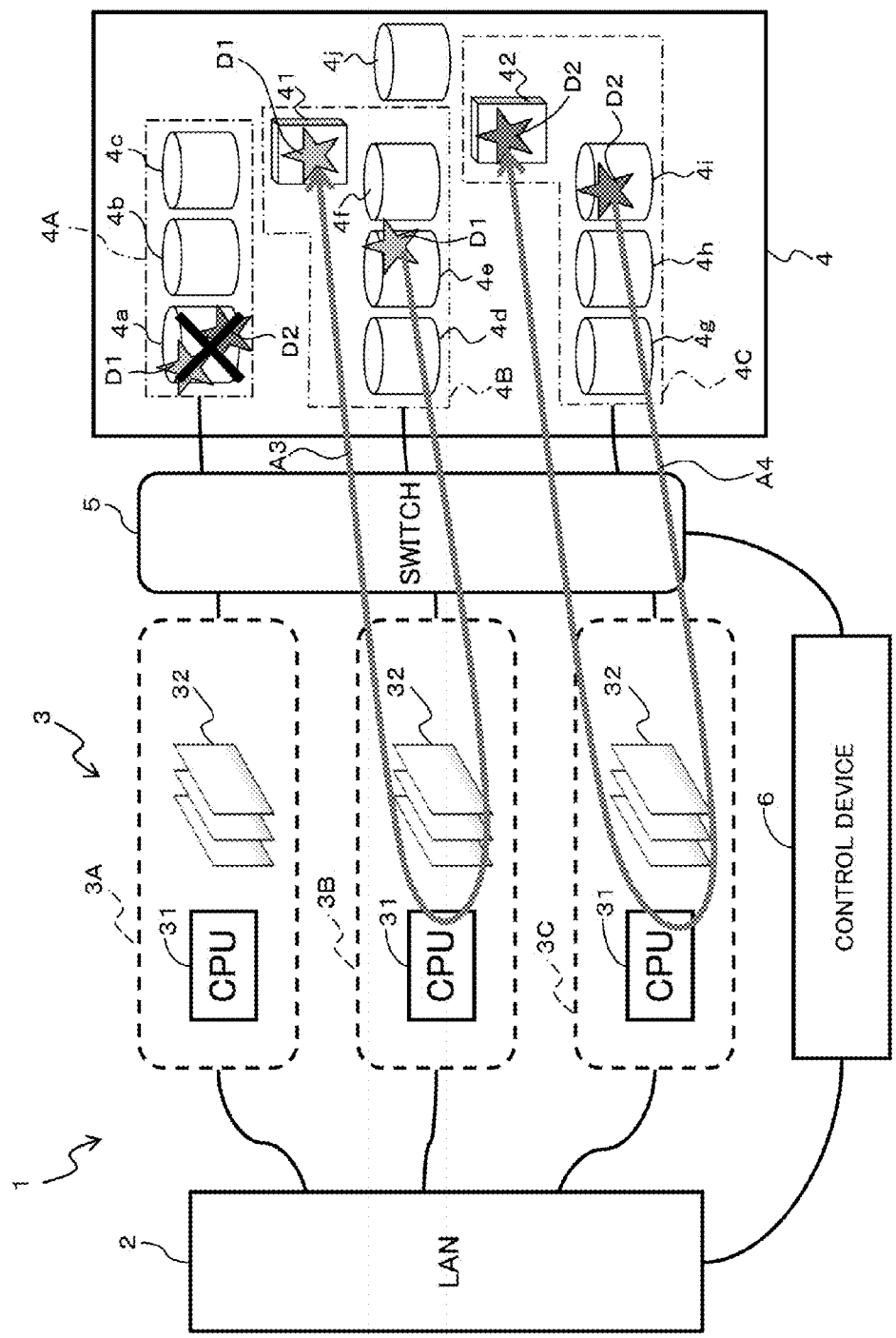

Next, an outline of the restoration process performed by the control device 6 when the HDD 4a storing the replicas D1 and D2 is faulty as illustrated in FIG. 2 in a state in which the replicas D1 and D2 are stored with the redundancy of 2 as illustrated in FIG. 1 will be described with reference to FIGS. 2 to 6. Here, a node including the faulty HDD 4a is referred to as a "first node", and two nodes including other HDDs 4e and 4i storing the replicas D1 and D2 that has been stored in the faulty HDD 4a are referred to as "second nodes". Further, the server (processing apparatus) 3A included in the first node is referred to as a "first processing apparatus", and the servers (processing apparatuses) 3B and 3C included in the two second nodes are referred to as "second processing apparatuses".

Here, when the HDD 4a storing the replicas D1 and D2 is faulty as illustrated in FIG. 2, the control device 6 controls the switch 5 such that the SSDs 41 and 42 that are unused data replication storage devices are connected to the servers (second processing apparatuses) 3B and 3C configuring the second node. As a result, the SSDs 41 and 42 used for data copy are included in the drive groups 4B and 4C, respectively. Thus, the servers 3B and 3C storing the replicas D1 and D2 of the object stored in the faulty HDD 4a newly exclusively use the SSDs 41 and 42, respectively.

Further, the control device 6 controls the servers 3B and 3C (the CPUs 31) such that the replicas D1 and D2 stored in the HDDs 4e and 4i are copied to the SSDs 41 and 42 connected to the servers 3B and 3C through the switch 5. As a result, in the server 3B and the second nodes belonging to the drive group 4B, the replica D1 to be restored is locally copied from the HDD 4e to the SSD 41 as indicated by an arrow A3 in FIG. 3. Similarly, in the server 3C and the second nodes belonging to the drive group 4C, the replica D2 to be restored is locally copied from the HDD 4i to the SSD 42 as indicated by an arrow A4 in FIG. 3. At this time, the replica number (the replica redundancy) is 2 and equal to or larger than before a drive failure occurs, and thus a risk of object loss is avoided.

Figure 4:
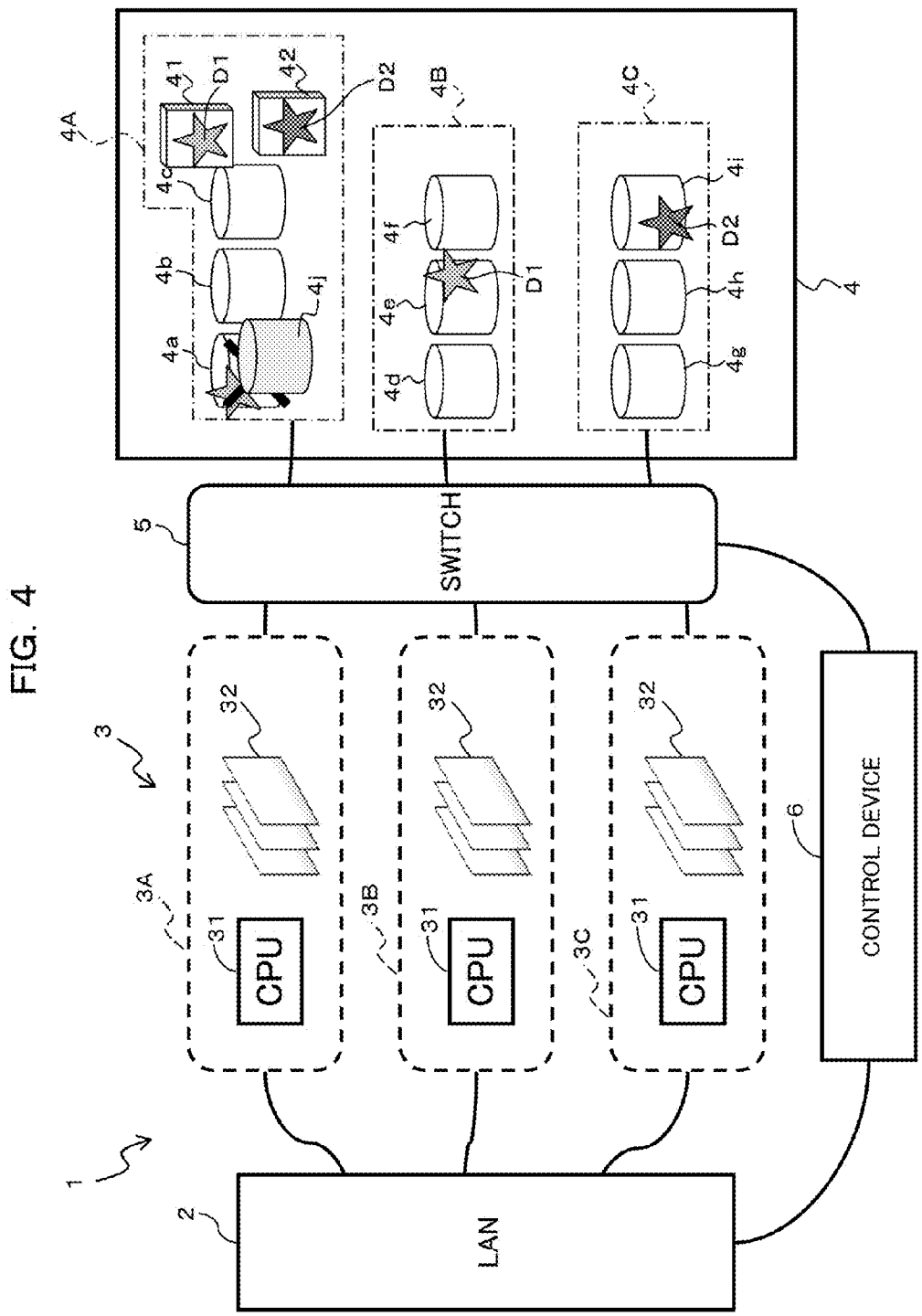
Figure 5:
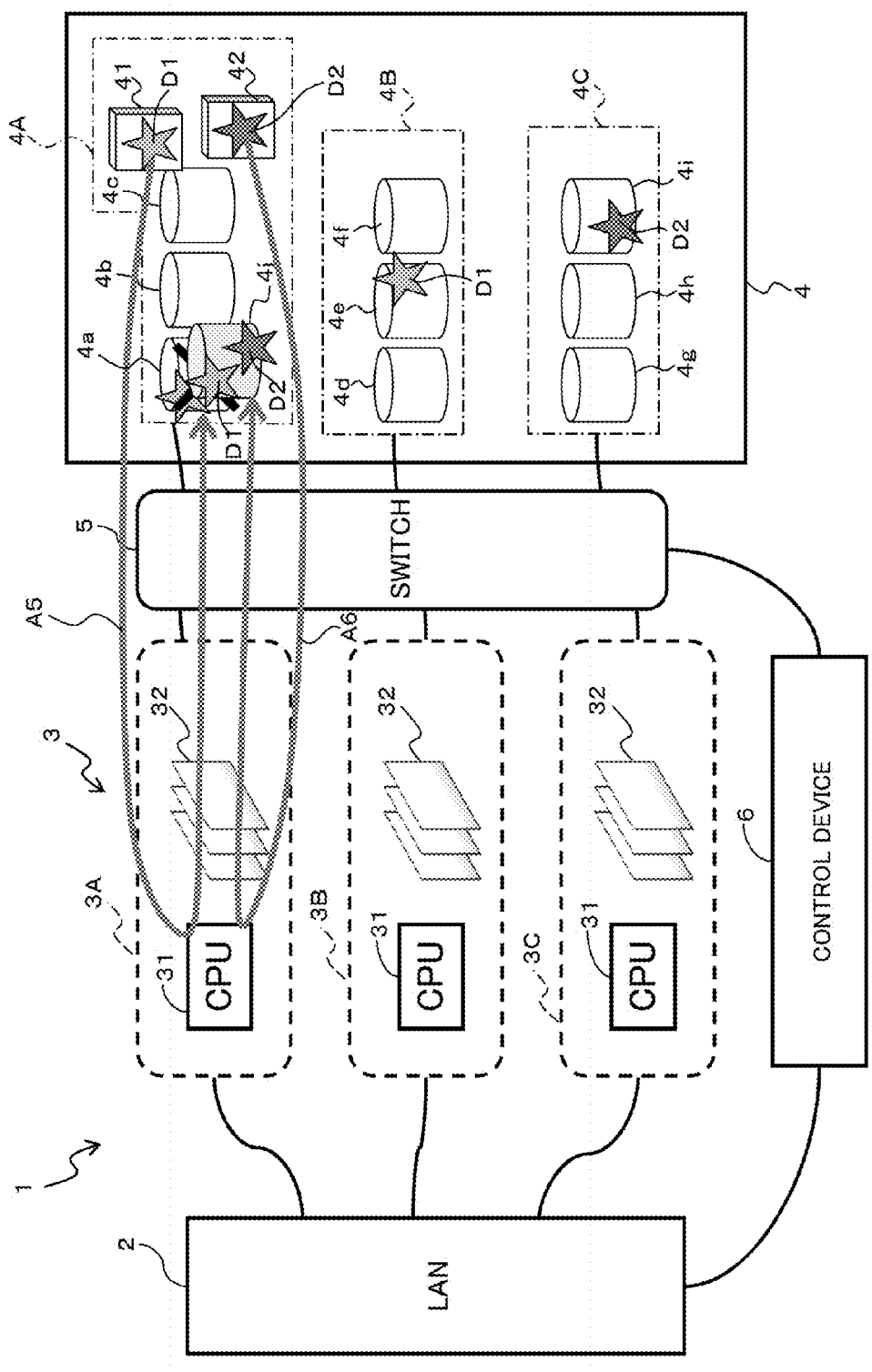

Thereafter, the control device 6 controls the switch 5 such that the SSDs 41 and 42 to which the replicas D1 and D2 are copied are disconnected from the servers 3B and 3C and connected to the server (first processing apparatus) 3A configuring the first node. As a result, the SSDs 41 and 42 used for data copy are included in the drive group 4A as illustrated in FIG. 4. Thus, the SSDs 41 and 42 are dedicated to the server 3A in which a drive failure occurred. At this time, the server 3A and the nodes belonging to the drive group 4A are logically reconstructed to the state before the drive failure occurs.

Further, the control device 6 controls the switch 5 such that the HDD 4j serving as the unused third storage device is connected to the server 3A instead of the HDD (first storage device) 4a. As a result, as illustrated in FIG. 4, the HDD 4j that is an extra drive for a backup replaced with a faulty drive is included in the drive group 4A, and is dedicated to the server 3A instead of the faulty HDD 4a.

Further, the control device 6 controls the server 3A (the CPU 31) such that the replicas D1 and D2 stored in the SSDs 41 and 42 used for data copy are stored in the HDD 4j connected to the server 3A through the switch 5. As a result, in the server 3A and the first nodes belonging to the drive group 4A, the replica D1 to be restored is copied from the SSD 41 to the HDD 4j as indicated by an arrow A5 in FIG. 5. Similarly, in the first node, the replica D2 to be restored is copied from the SSD 42 to the HDD 4j as indicated by an arrow A6 in FIG. 5.

Figure 6:
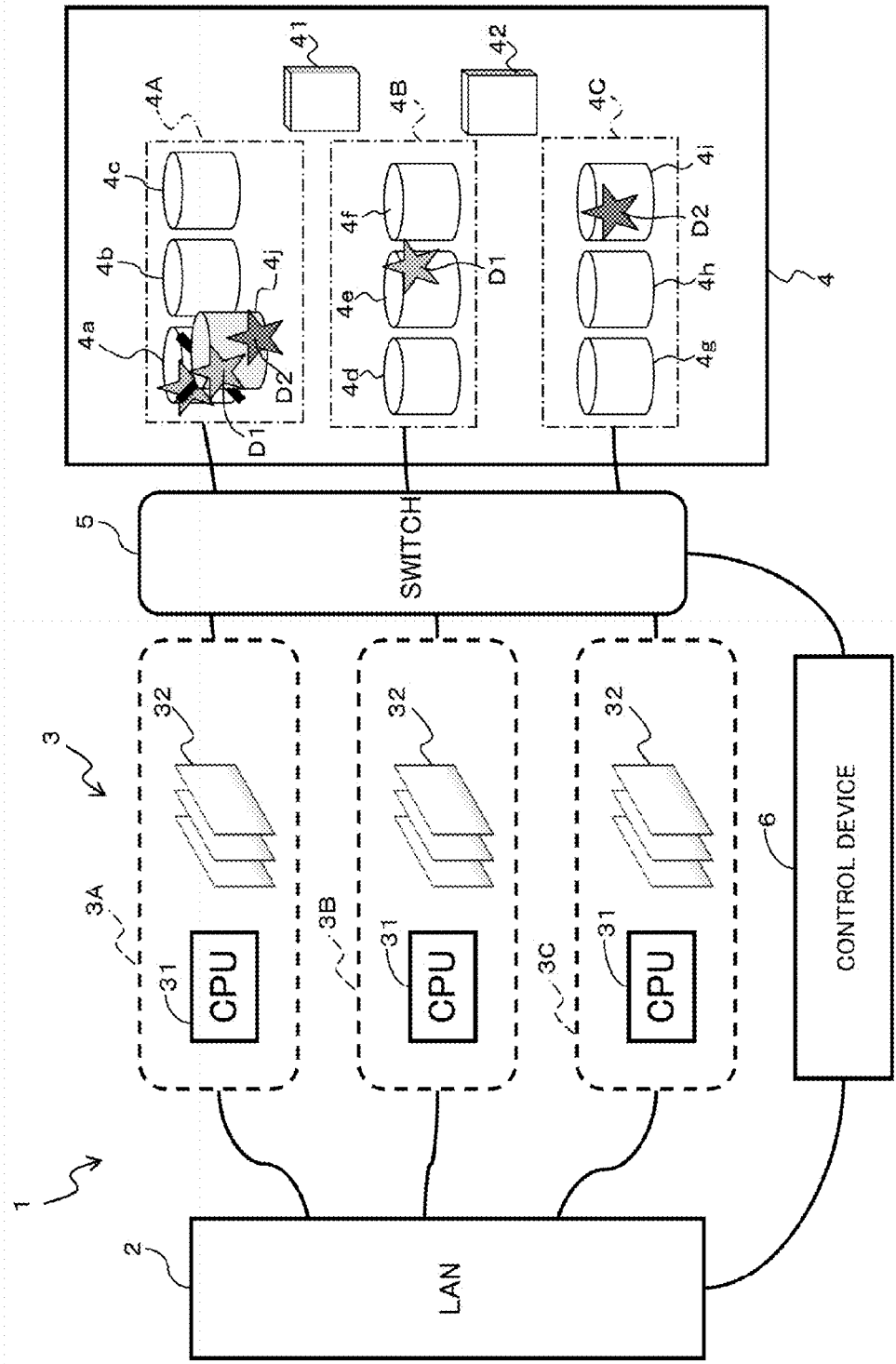

Lastly, the control device 6 stores the replicas D1 and D2 in the HDD 4j, and then controls the switch 5 such that the SSDs 41 and 42 used for data copy is disconnected from the server 3A to return to an unused state. As a result, as illustrated in FIG. 6, the SSDs 41 and 42 return to a free state, that is, a disconnected state in which the SSDs 41 and 42 are not connected to any of the servers 3A to 3C. At this time, one extra drive for a backup enters the used state from the unused state, and the object storage system 1 is also restored to the same state as before a drive failure occurs.

Since the replica redundancy restoration process is performed using the switch 5 between the server group 3 and the drive enclosure 4 as described above with reference to FIGS. 1 to 6, in the present embodiment, the replica redundancy is restored without affecting the bandwidth of the LAN 2. Thus, even when a load in the LAN 2 is large, the replica redundancy restoration process is not affected by the LAN 2. For this reason, even in the configuration in which the bandwidth of the LAN 2 is limited, it is possible to rapidly restore a reduction in the replica number, and even when a HDD being used is faulty, it is possible to immediately return a distribution arrangement situation of a replica to an initial ideal allocation.

Further, as the storage device for data replication, a HDD may be used instead of the SSDs 41 and 42. Since HDDs are cheaper in capacity unit price than SSDs, when a HDD is used as the data replication storage device, the system 1 of the present embodiment can be provided at the lower cost when an SSD is used.

On the other hand, SSDs are faster in transfer speed at the time of a reading process and a transfer speed at the time of a writing process than HDDs. For this reason, as an SSD is used as the storage device for data replication as in the present embodiment, the replica redundancy restoration process can be performed at a higher speed than when a HDD is used as the storage device for data replication. In the present embodiment, it is possible not only to effectively use a small number of expensive devices but also to perform the replica redundancy restoration process at a high speed at a low cost as possible by equipping two SSDs, for example, as the storage device for data replication.

Figure 7:
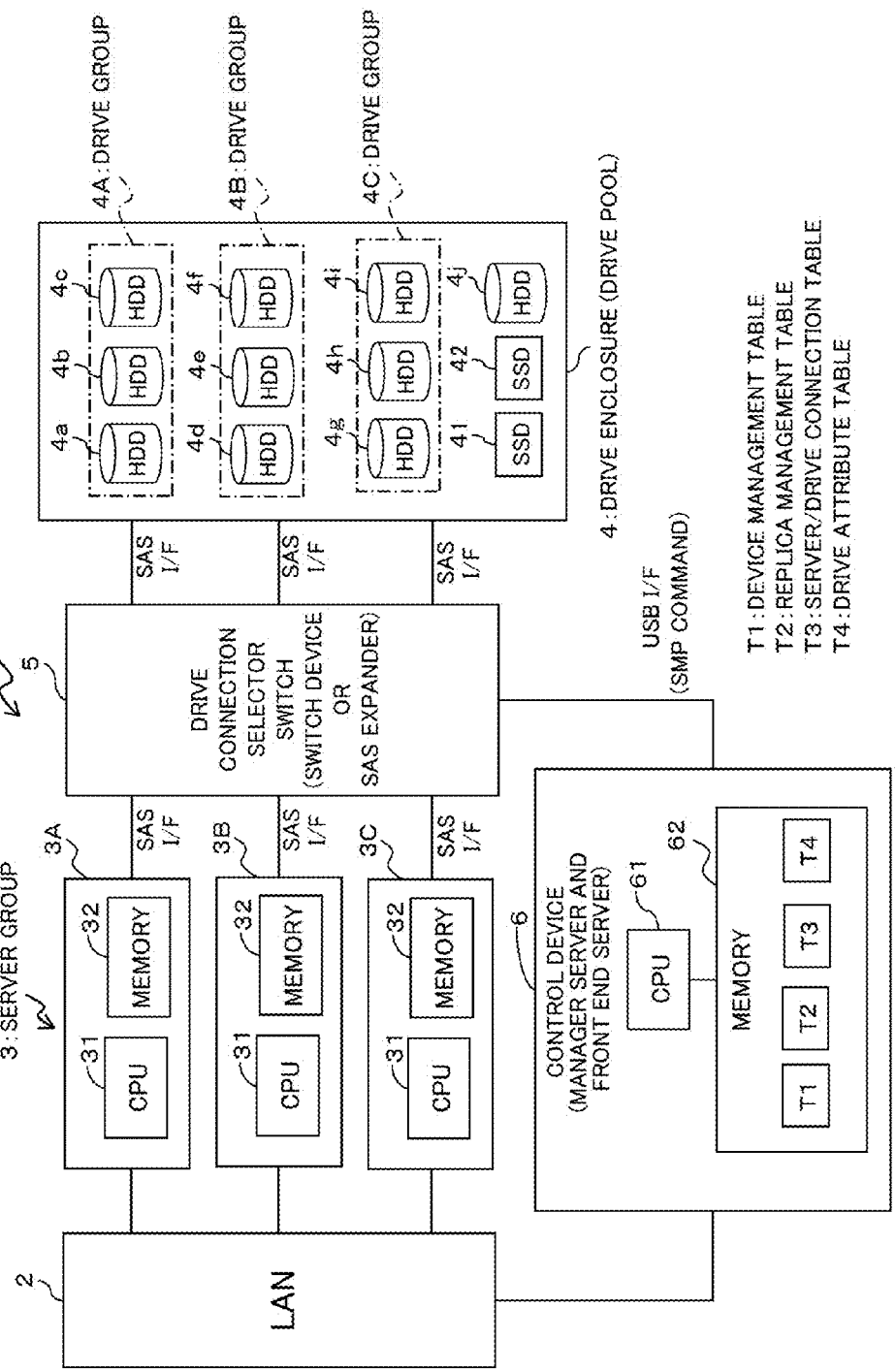
FIG. 7 is a block diagram illustrating a concrete hardware configuration and a functional configuration of the object storage system according to the present embodiment.

[2] Concrete Hardware Configuration and Function of Object Storage System of Present Embodiment Next, a hardware configuration and a function of an object storage system (information processing apparatus) 1 will be more concretely described with reference to FIGS. 7 to 17. First, a concrete hardware configuration and a functional configuration of the object storage system 1 according to the present embodiment will be described with reference to FIG. 7. FIG. 7 is a block diagram illustrating a concrete hardware configuration and a functional configuration of the object storage system 1. In the drawings, the same reference numerals as the reference numerals described above denote the same parts or almost the same parts, and thus a detailed description thereof is omitted.

The object storage system 1 illustrated in FIG. 7 includes a LAN (network switch) 2, a server group 3, a drive enclosure 4, a drive connection selector switch 5, and a control device 6, similarly to the system 1 illustrated in FIGS. 1 to 6.

In the system 1 illustrated in FIG. 7, the control device 6 includes a CPU (processing unit) 61 and a memory 62. The memory 62 stores various kinds of data, various kinds of programs, and the like which are necessary for processing of the CPU 61. Among various kinds of programs, there is a control program performed by the CPU 61 when the control device 6 functions as the manager server and the front end server. Further, among various kinds of data, there are tables T1 to T4 which are referred to, collated, searched for, and updated by the CPU 61 when the control device 6 functions as the manager server and the front end server. The tables T1 to T4 will be described later with reference to FIGS. 13 to 16. As the memory 62, various kinds of storage devices such as a RAM, a HDD, or an SSD may be used.

Figure 8:
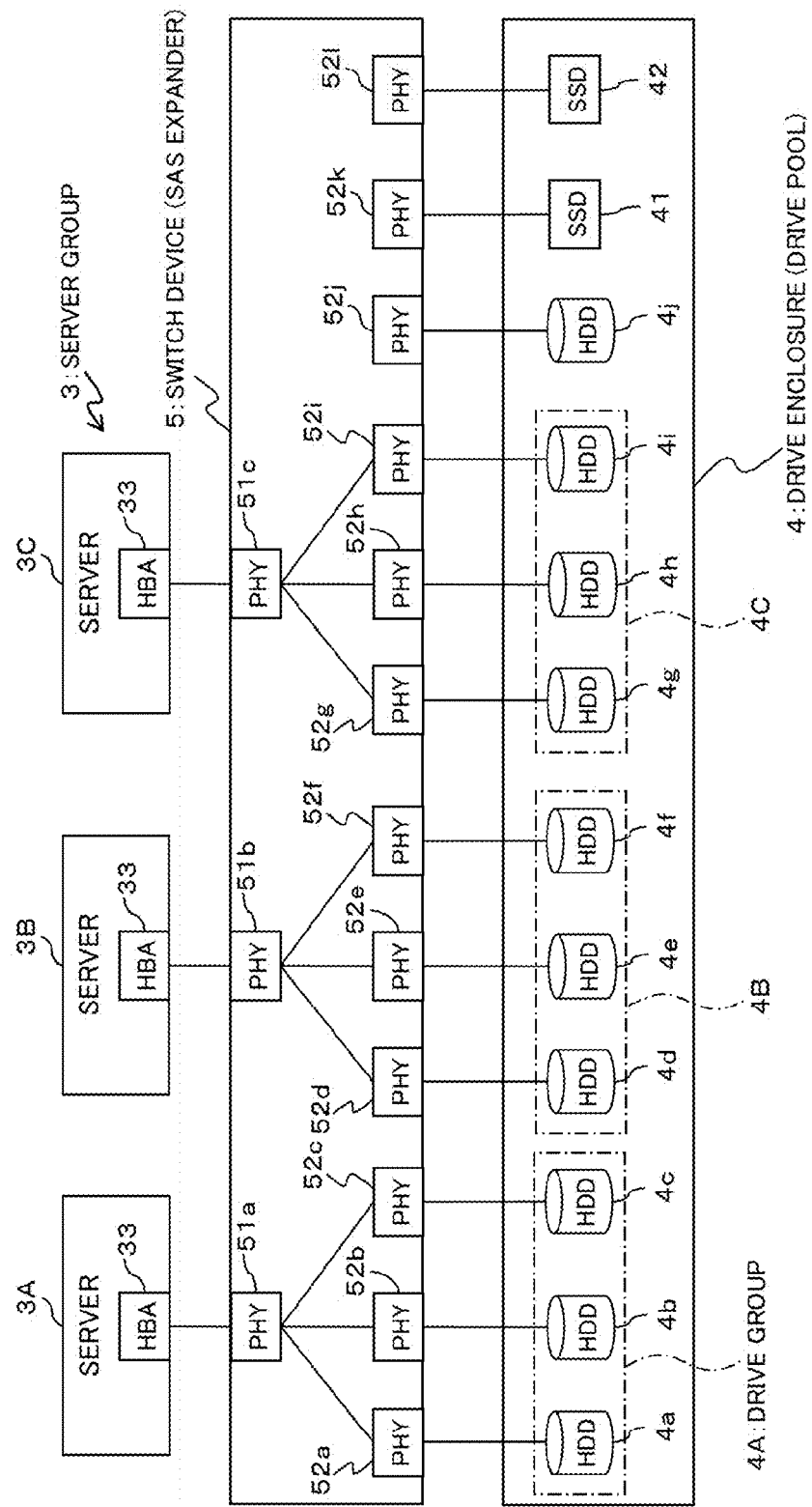
FIG. 8 is a diagram for describing an SAS expander in the object storage system according to the present embodiment.

In the system 1 illustrated in FIG. 7, the switch 5 is configured with a serial attached small computer system interface (SCSI) (SAS) expander illustrated in FIG. 8. The SAS expander 5 is connected to the server group 3 and the drive enclosure 4 through an SAS interface. Further, the SAS expander 5 is connected to the control device 6 via a USB interface. When the control device 6 functions as the manager server, the control device 6 transmits a serial management protocol (SMP) command to the SAS expander 5 through the USB interface, and operates zoning information of the SAS expander 5. As a result, it is possible to arbitrarily set a combination of servers belonging to each of a plurality of nodes (three nodes in FIGS. 7 to 9) and one or more HDDs and/or SSDs. Further, the SAS expander 5 may be connected to the control device 6 through an interface such as the Ethernet.

[2-1] SAS Expander (Switch Device)

Next, the SAS expander 5 will be described with reference to FIGS. 8 and 9. FIG. 8 is a diagram for describing the SAS expander (switch device) 5 in the object storage system 1 according to the present embodiment. FIG. 9 is a diagram for describing a zoning setting in the SAS expander 5 illustrated in FIG. 8.

The SAS expander 5 includes PHY (physical layer ports) 51a to 51c connected to host bus adapters (HBAs) 33 of the servers 3A to 3C, and PHYs 52a to 52l connected to the HDD 4a to 4j and the SSDs 41 and 42. The HBAs 33 of the respective servers are associated with the drives 4a to 4j, 41, and 42 by a zoning setting of the SAS expander 5. The zoning setting may be changed by an SMP command from the control device 6.

In the SAS expander 5 illustrated in FIG. 8, the zoning setting is performed as illustrated in FIG. 9. In other words, the PHYs 51a and 52a to 52c are set to a zone ID (IDentification) "Z1" corresponding to the server 3A. As a result, one node in which the PHY 51a is connected the PHYs 52a to 52c, and the server 3A is associated with the HDDs 4a to 4c is configured in the zone Z1. Further, the PHYs 51b and 52d to 52f are set to a zone ID "Z2" corresponding to the server 3B. As a result, one node in which the PHY 51b is connected the PHYs 52d to 52f, and the server 3B is associated with the HDDs 4d to 4f is configured in the zone Z2. Furthermore, the PHYs 51c and 52g to 52i are set to a zone ID "Z3" corresponding to the server 3C. As a result, one node in which the PHY 51c is connected the PHY 52g to 52i, and the server 3C is associated with the HDDs 4g to 4i is configured in the zone Z3.

Further, in the SAS expander 5 illustrated in FIG. 8, a zone ID "Z4" that does not correspond to any server and is used for disconnection is set in addition to the zones Z1 to Z3 respectively corresponding to the servers 3A to 3C. In other words, since the PHYs 52j, 52k, and 52l connected to the HDD 4j used as an extra drive for a backup and the SSDs 41 and 42 used for data copy are set to the zone ID "Z4" as illustrated in FIG. 9, the HDD 4j and the SSDs 41 and 42 are not connected to any of the servers 3A to 3C, that is, are in the disconnected state.

[2-2] Exemplary Setting of Drive ID

Next, an exemplary setting of a drive ID used in the object storage system 1 according to the present embodiment, that is, an ID of each drive (each of the HDD 4a to 4j and the SSDs 41 and 42) aggregated in the drive pool 4 will be described with reference to FIGS. 10 to 12.

In the present embodiment, for example, designation of a drive to be connected to or disconnected from the server group 3 through the switch 5 and management of a connection state of each drive are performed using a drive ID. Any value can be set as the drive ID as long as the value is a unique value identifying each drive. In the present embodiment, for example, the drive ID is set based on a drive storage position in the drive enclosure 4 as illustrated in FIGS. 10 to 12.

Figure 10:
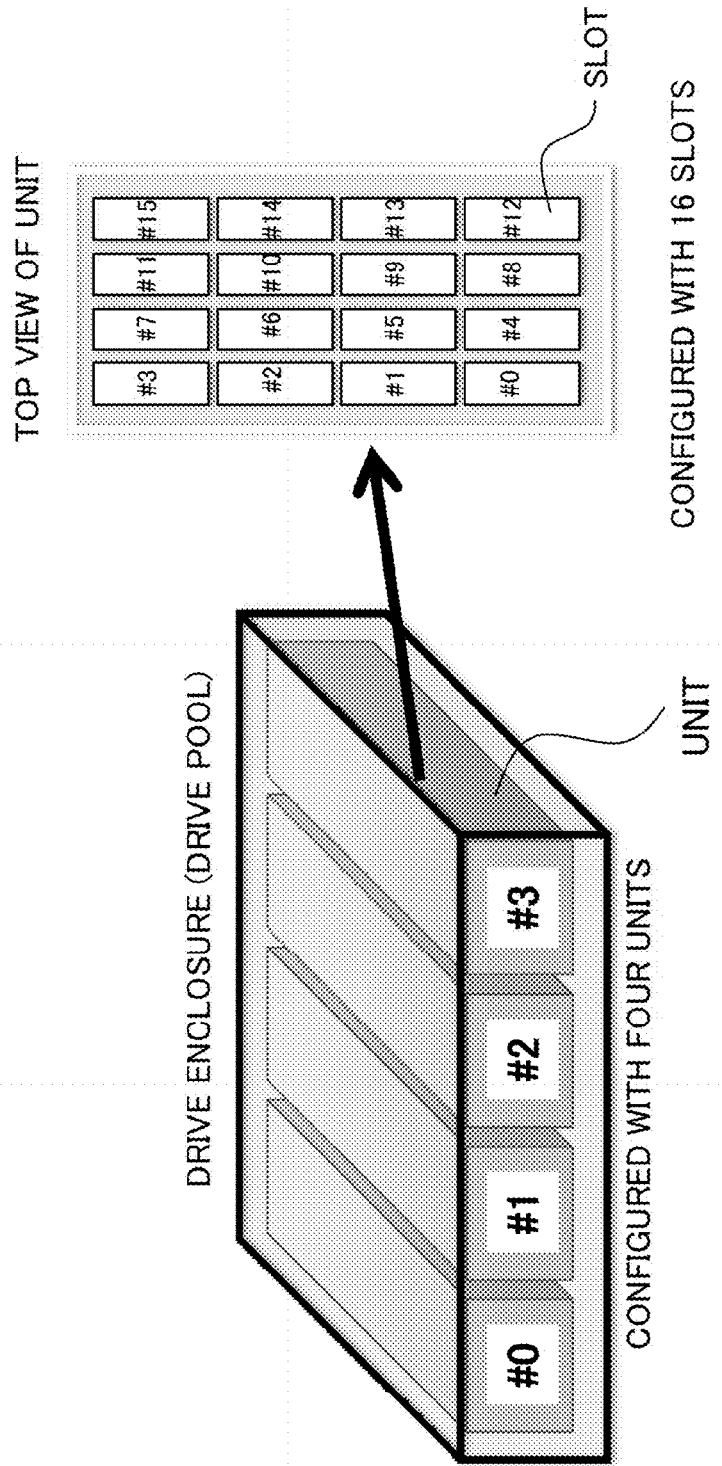
FIGS. 10 to 12 are diagrams for describing an exemplary setting of a drive ID in the object storage system according to the present embodiment.

When four units #0 to #3 are mounted in one drive enclosure, 16 slots #0 to #15 are equipped in each unit, and a HDD or an SSD is mounted in each lost as illustrated in FIG. 10, the drive ID is set as follows. In other words, for example, for a drive mounted in the slot #3 of the unit #2, "2-3" is set and assigned as the drive ID. Either a HDD or an SSD can be mounted in each slot through the SAS interface or an SATA (serial advanced technology attachment (SATA) interface.

Figure 11:
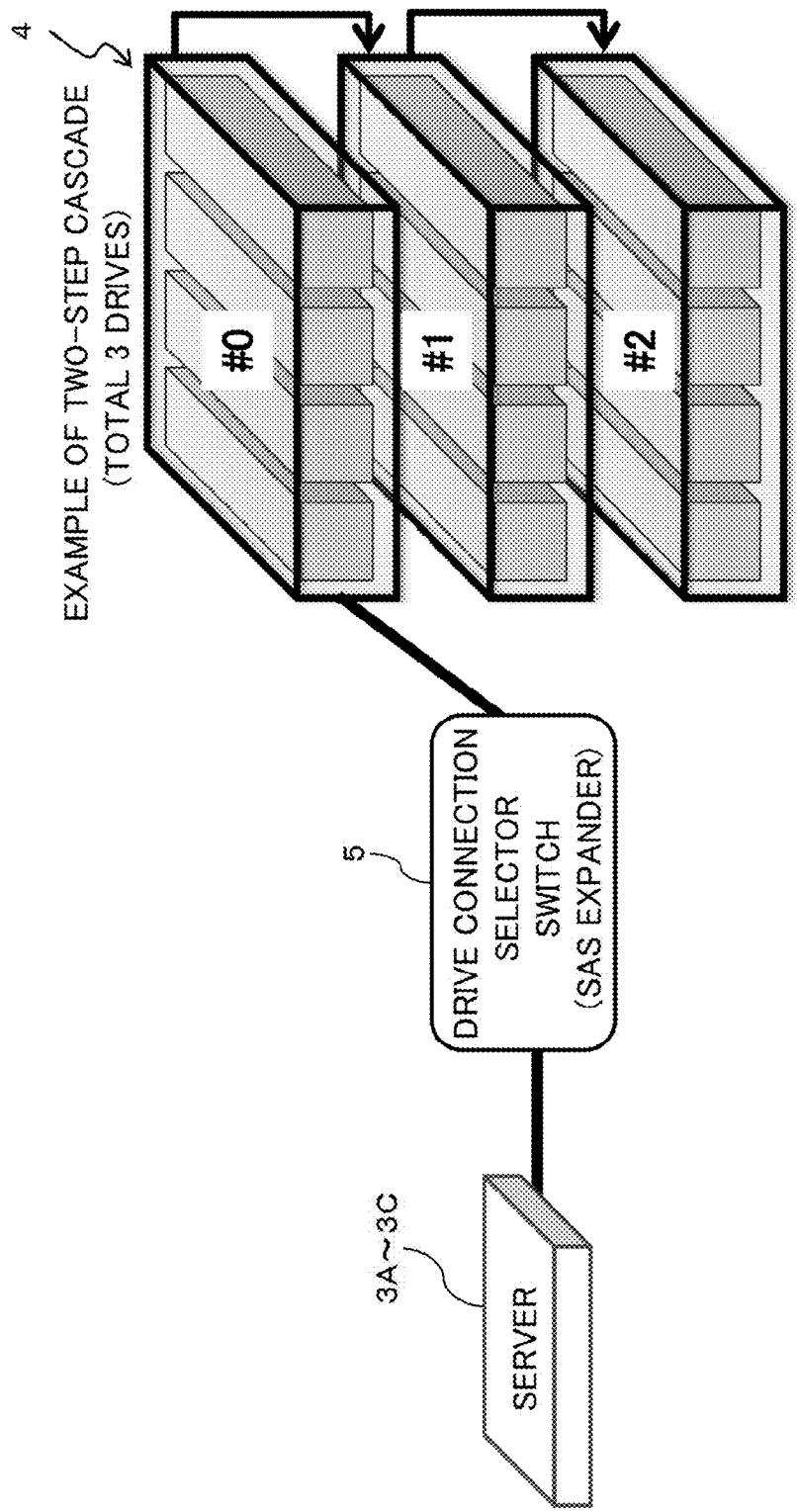

Further, when the size of the drive pool 4 is increased by connecting the drive enclosures illustrated in FIG. 10 in a cascade form as illustrated in FIG. 11, the drive ID is set as follows. FIG. 11 illustrates an example (an example of a two-step cascade) in which three drive enclosures illustrated in FIG. 10 are connected in a cascade form. At this time, the drive enclosures may be assigned numbers of #0, #1, #2, and the like in order from the enclosure in the head of the cascade, and in this case, for example, for a drive mounted in the slot #3 of the unit #2 in the enclosure #1, "1-2-3" may be set and assigned as the drive ID.

Figure 12:
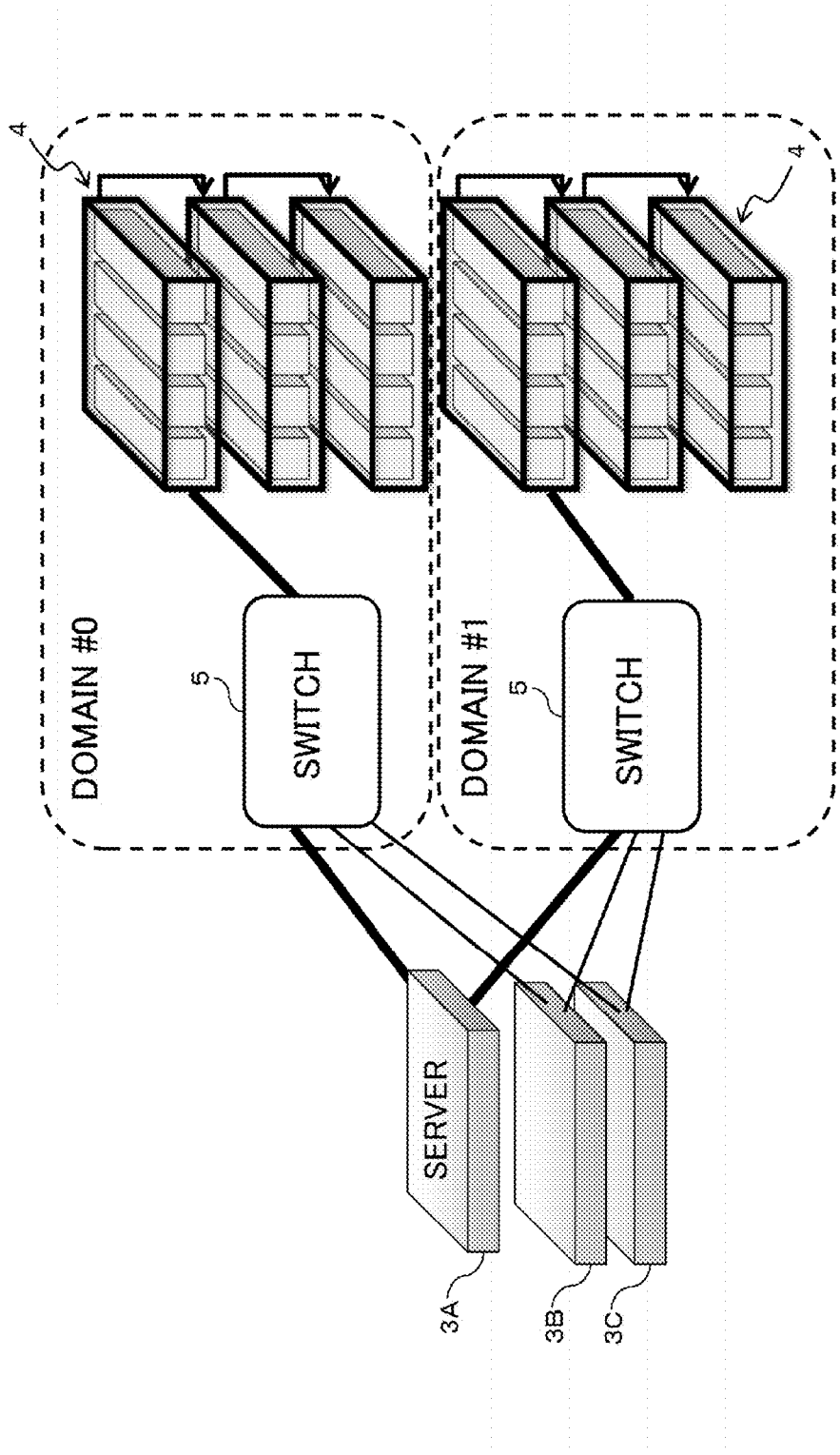

Further, when the size of the drive pool 4 is increased by connecting each server to a plurality of cascade sets (the enclosure sets illustrated in FIG. 11) as illustrated in FIG. 12, the drive ID is set as follows. FIG. 12 illustrates an example in which the two enclosure sets illustrated in FIG. 11 are connected to each server. Each enclosure set is referred to as a "domain". At this time, two sets of domains are assigned #0 and #1, and in this case, for example, for a drive mounted in the slot #3 of the unit #2 in the enclosure #1 of the domain #0, "0-1-2-3" may be set and assigned as the drive ID.

[2-3] Tables T1 to T4

Next, the tables T1 to T4 used in the object storage system 1 according to the present embodiment will be described with reference to FIGS. 13 to 16. Here, the device management table T1 and the replica management table T2 are used when the front end server function of the control device 6 performs a distribution arrangement of objects as will be described later with reference to FIG. 17. Further, the server/drive connection table T3 is updated each time the manager server function of the control device 6 performs a connection or disconnection of a drive. Further, the drive attribute table T4 is used to decide an SSD for data copy when the manager server function of the control device 6 performs the replica redundancy restoration process.

[2-3-1] Device Management Table T1

First, the device management table T1 in the object storage system 1 according to the present embodiment will be described with reference to FIG. 13. In the device management table T1, at least a device ID logically identifying a device such as a HDD or an SSD is associated with a drive ID physically specifying an actual drive such as a HDD or an SSD corresponding to the device ID.

In the device management table T1 illustrated in FIG. 13, a device ID (devID), a drive ID (driveID), a mount point, and a server IP (Internet Protocol) address are associated with one another. The drive ID is an ID described above with reference to FIGS. 10 to 12. The mount point represents a path of a directory in which a drive associated with a device ID is mounted in a file system of a server. A directory name serving as the mount point may be arbitrary, and in the present embodiment, a character string as the drive ID is used as the mount point. Further, the server IP address is used to perform communication with a drive associated with a device ID via the LAN 2. In implementing the function of the present embodiment, a correspondence relation between the device ID and the drive ID may be held in the device management table T1, and the mount point and the server IP address may be omitted.

[2-3-2] Replica Management Table T2

The replica management table T2 in the object storage system 1 according to the present embodiment will be described with reference to FIG. 14. The replica management table T2 is a table having a hash correspondence of each replica used when replicas of an object are distributedly arranged. In the following description, the replica redundancy is assumed to be 3, and FIG. 14 illustrates an example in which the replica redundancy is 3.

Figure 14:
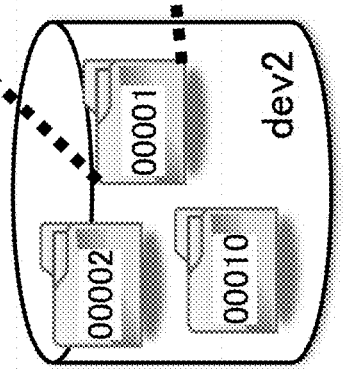
FIG. 14 is a diagram for describing a replica management table in the object storage system according to the present embodiment.

In the replica management table T2 illustrated in FIG. 14, device IDs specifying three devices (drives) in which three replicas #1 to #3 are to be stored are associated with a upper n-bit value of a hash value of an object. The hash value of the object is a bit string of a certain width obtained by applying a one-way hash function such as a message digest algorithm 5 (MD5) to a path name of an object including the user's account name, an object name, or the like. As the replica management table T2 is collated and search using the upper n-bit value of the hash value as a key, the three devices in which the three replicas #1 to #3 of the object are to be stored are specified. The replica management table T2 is generated before the system 1 is activated and managed by the control device (front end server) 6.

Further, a correspondence between the upper n-bit value of the hash value of the object and the three device IDs is randomly decided basically. Here, three devices associated with the same upper n-bit value are assumed to belong to different zones (nodes). In other words, three replicas of the same hash value are assumed to be assigned devices belonging to different zones (nodes).

In the replica management table T2 illustrated in FIG. 14, for example, three device IDs "dev0", "dev1", and "dev2"

are assigned to a value "00001" of the upper n bits of the hash value. Thus, three replicas of an object in which the upper n-bit value of the hash value is "00001" are arranged in three devices specified by the device IDs "dev0", "dev1", and "dev2". The device IDs "dev0", "dev1", and "dev2" are recognized as HDDs corresponding to the drive IDs "0-0-0-0", "0-0-0-1", and "0-0-0-2" based on the device management table T1 illustrated in FIG. 13.

Next, a storage example of an object (replica) in each HDD will be described with reference to FIG. 14. In each HDD, a directory is set to each upper n-bit value of a hash value of an object. All objects having the hash values starting from the upper n-bit value set to the directory are stored in each directory. For example, when a replica distribution arrangement is performed using the replica management table T2 illustrated in FIG. 14 as will be described with reference to FIG. 17, all objects having hash values starting from "00001", "00002", and "00010" are stored in the HDD of the device ID "dev2".

[2-3-3] Server/Drive Connection Table T3

The server/drive connection table T3 in the object storage system 1 according to the present embodiment will be described with reference to FIG. 15. In the server/drive connection table T3 illustrated in FIG. 15, a server ID (serverID) specifying a server is associated with a drive ID (driveID) specifying a drive to be connected to a server specified by the server ID. The server/drive connection table T3 is updated by the control device 6 (manager server) each time a connection or disconnection of a drive is performed by the switch 5.

As the server ID, for example, a value decided by a hardware component such as a number of a port/PHY to be connected to a corresponding server may be used, and a value decided using a table in which a server is associated with an IP address separately or like may be used. Further, as the drive ID, for example, the ID described above with reference to FIGS. 10 to 12 is used.

Further, in the server/drive connection table T3, "free" is set as a server ID, and an ID of a drive in the disconnected state that is not connected to any of the servers 3A to 3C is associated with the server ID "free". In the server/drive connection table T3 illustrated in FIG. 15, for example, drive IDs "0-0-1-0", "0-0-1-1", and "0-0-1-2" of the HDD 4j used as an extra drive for a backup and the SSDs 41 and 42 used for data copy are associated with the server ID "free".

[2-3-4] Drive Attribute Table T4

Figure 16:
FIG. 16 is a diagram for describing a drive attribute table in the object storage system according to the present embodiment.

The drive attribute table T4 in the object storage system 1 according to the present embodiment will be described with reference to FIG. 16. In the drive attribute table T4, a drive ID (driveID) is associated with an attribute of a drive specified by the drive ID. Here, an attribute is information representing whether a corresponding drive is a HDD or an SSD as illustrated in FIG. 16, and used when the control device (manager server) 6 decides an SSD for data copy. As the drive ID, for example, the ID described above with reference to FIGS. 10 to 12 is used.

The drive attribute table T4 is managed by the control device (manager server) 6. The drive attribute table T4 may be generated in advance and then stored in the memory 62, or may be generated such that the control device (manager server) 6 investigates drives belonging to the system 1 when the system 1 is activated and collects drive IDs and attributes (HDD or SSD) of respective drives.

[2-4] Replica Distribution Arrangement During Normal Operation

Next, a replica distribution arrangement during a normal operation in the object storage system 1 according to the present embodiment will be described with reference to FIG. 17.

The control device (front end server) 6 of the present embodiment manages, for example, a PUT command and a GET command given from the user. At this time, the control device 6 obtains a hash value of an object (a bit string of a certain width) by applying one-way hash function such as MD5 to a path name of an object including the user's account name, an object name, or the like. Then, the control device 6 collates and searches the replica management table T2 using the obtained upper n-bit value of the hash value as a key, and acquires three device IDs (for example, dev0, dev1, and dev2) in which three replicas #1 to #3 of a corresponding object are to be stored.

Thereafter, the control device 6 collates and searches the device management table T1 using the acquired three device IDs as a key, and acquires three drive IDs (for example, 0-0-0-0, 0-0-0-3, and 0-0-0-6) corresponding to the three device IDs (for example, dev0, dev1, and dev2). Further, the control device 6 collates and searches the server/drive connection table T3 using the acquired three device IDs (for example, 0-0-0-0, 0-0-0-3, and 0-0-0-6), and acquires IDs (for example, 0, 1, and 2) of three servers to be connected to the three devices.

Figure 17:
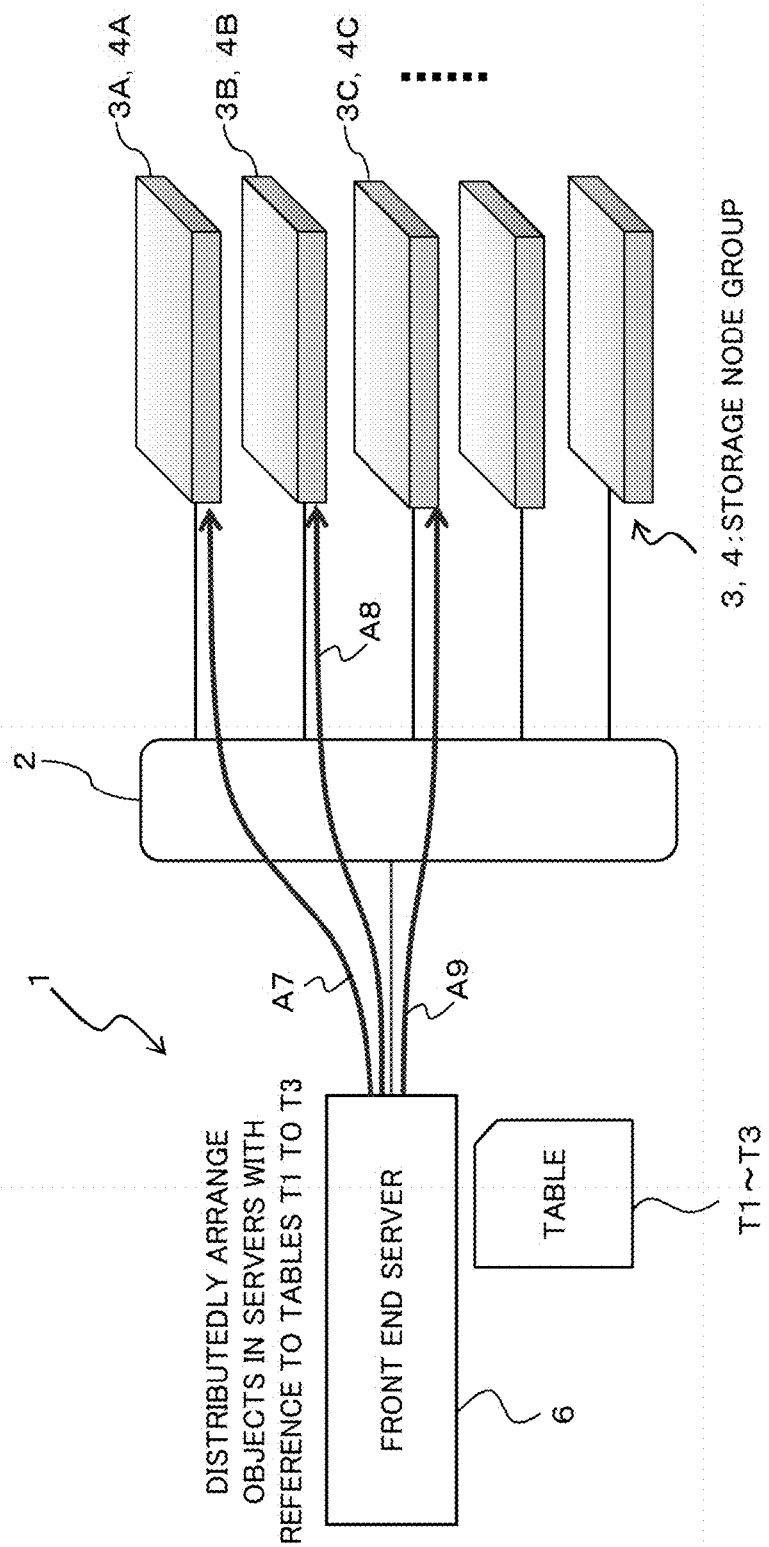
FIG. 17 is a diagram for describing a replica distribution arrangement during a normal operation in the object storage system according to the present embodiment.

Then, the control device 6 transfers the three replicas #1 to #3 of the object to be written in the HDDs specified by the acquired three device IDs (for example, 0-0-0-0, 0-0-0-3, and 0-0-0-6) through the servers specified by the acquired three server IDs (for example, 0, 1, and 2) as illustrated in FIG. 17 (see arrows A7 to A9).

Through this operation, even in the present object storage system 1, as a counter-measure against a drive failure, in order to prevent an object from being lost when a drive failure occurs, replicas that are replicated data pieces of the same object are stored in three HDDs that are under control of three different servers.

[3] Operation of Object Storage System of Present Embodiment

Next, the replica redundancy restoration process performed by the object storage system 1 according to the present embodiment having the above-described configuration will be described with reference to FIGS. 18 to 36.

In the following description, the replica redundancy restoration process is performed using the tables T1 to T4 described above with reference to FIGS. 13 to 16, and the replica redundancy is assumed to be 3.

Further, 0, 1, 2, and the like are assumed to be the server IDs of the servers 3A, 3B, 3C, and the like, and 0-0-0-0, 0-0-0-1, 0-0-0-3, 0-0-0-4, 0-0-0-6, and 0-0-0-7 are assumed to be the drive IDs of the HDDs 4a, 4b, 4d, 4e, 4g, and 4h, as illustrated in FIGS. 19, 22, 25, 28, 31, and 34. Further, 0-0-1-0 is assumed to be the drive ID of the HDD 4j used as an extra drive for a backup, and 0-0-1-1 and 0-0-1-2 are assumed to be the drive IDs of the SSDs 41 and 42 used for data copy. Furthermore, in FIGS. 19, 22, 25, 28, 31, and 34, a hyphen (-) inserted in each ID is omitted.

[3-1] Faulty Drive Disconnection Process

First, a faulty drive disconnection process performed by the object storage system 1 according to the present embodiment will be described according to a flowchart (steps S11 to S14) illustrated in FIG. 18 with reference to FIGS. 19 and 20. FIG. 19 illustrates a node configuration of the system 1 corresponding to the process of FIG. 18, and FIG. 20 is a diagram for describing a process on the table T3 corresponding to the process of FIG. 18.

As illustrated in FIGS. 19 and 20, in the system 1 directly before a drive failure occurs, three storage nodes (the zone Z1 to Z3) are constructed through the switch 5. The HDD 4a having the drive ID "0-0-0-0" and the HDD 4b having the drive ID "0-0-0-1" and the server 3A having the server ID "0" belong to the node in the zone Z1. The HDD 4d having the drive ID "0-0-0-3" and the HDD 4e having the drive ID "0-0-0-4" and the server 3B having the server ID "1" belong to the node in the zone Z2. The HDD 4g having the drive ID "0-0-0-6" and the HDD 4h having the drive ID "0-0-0-7" and the server 3C having the server ID "2" belong to the node in the zone Z3. Further, the HDD 4j having the drive ID "0-0-1-0" and the SSDs 41 and 42 having the drive IDs "0-0-1-1" and "0-0-1-2" are associated with the server ID "free", and in the disconnected state (free state) in which the drives are not connected to any of the servers 3A to 3C.

Figure 18:
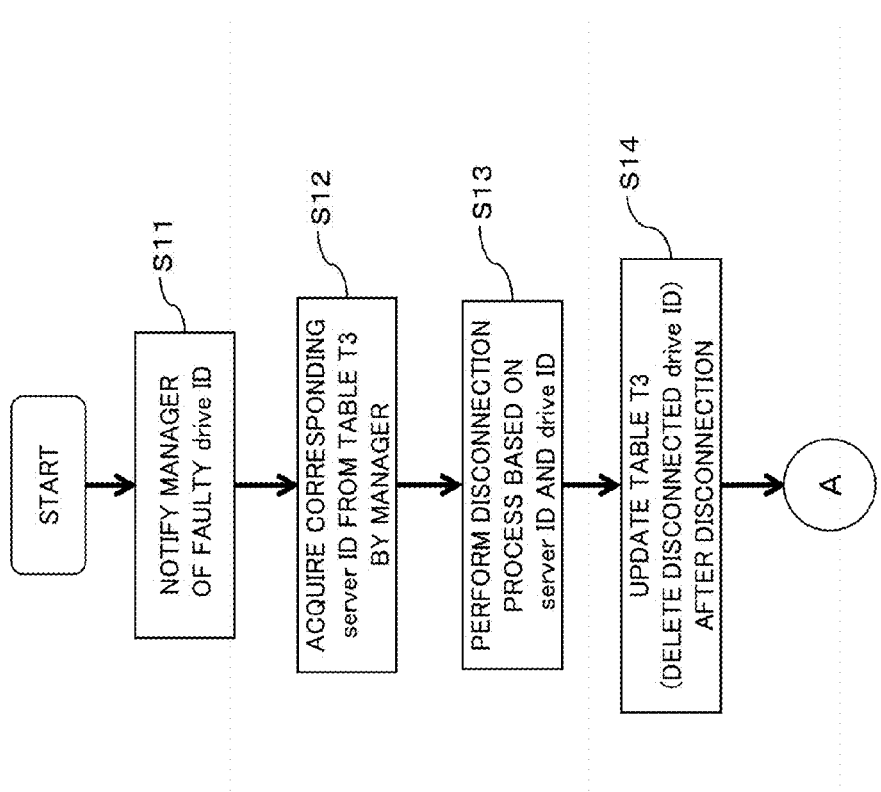
FIG. 18 is a flowchart for describing a replica redundancy restoration process (faulty drive disconnection process) performed by the object storage system according to the present embodiment.
Figure 19:
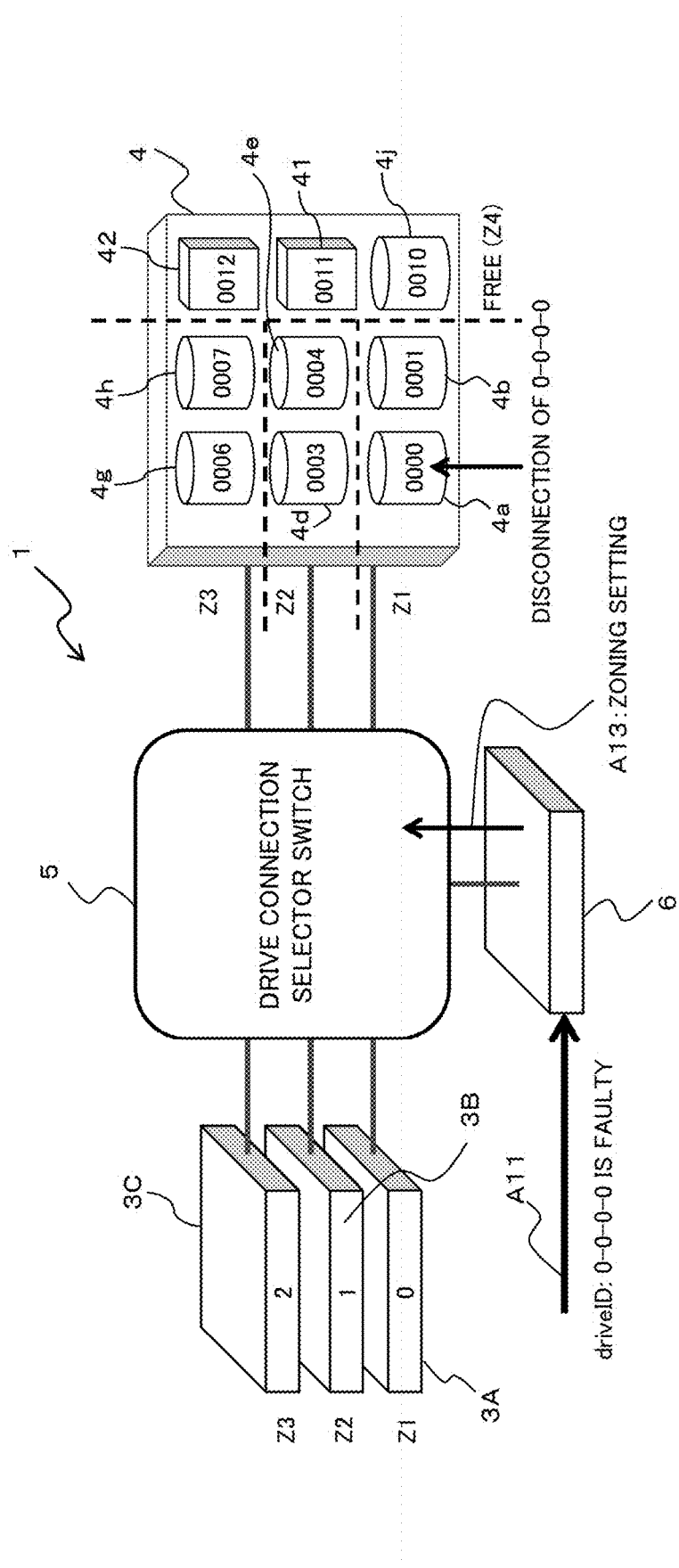

When a failure occurs in the HDD 4a during the operation of the system 1, an operator or a monitoring device (not illustrated) detects the failure through a certain means, and notifies the control device (manager server which is also referred to simply as a "manager") 6 of the occurrence of the failure together with the drive ID "0-0-0-0" of the faulty HDD 4a (see step S11 of FIG. 18 and an arrow A11 of FIG. 19). At this time, as the failure occurs in the HDD 4a, in the system 1, a replica stored in the HDD 4a is lost, the replica redundancy is reduced from 3 to 2, and the manager 6 performs a process of restoring the replica redundancy to 3 (steps S12 to S33) as follows.

The manager 6 that is notified of the occurrence of the failure collates and searches the server/drive connection table T3 using the drive ID "0-0-0-0" of the faulty HDD 4a as a key, and acquires the server ID "0" corresponding to the faulty HDD 4a (see step S12 of FIG. 18 and an arrow A12 of FIG. 20). Thereafter, the manager 6 changes the zoning setting in the SAS expander 5 based on the server ID "0" and the drive ID "0-0-0-0" through the USB interface, and performs the disconnection process of disconnecting the HDD 4a of the drive ID "0-0-0-0" from the server 3A of the server ID "0" (see step S13 of FIG. 18 and an arrow A13 of FIG. 19). At this time, as the zoning setting is changed, in the SAS expander 5, the connection state between the PHY 51a and the PHY 52a (see FIG. 8) is released, and the PHY 52a and the HDD 4a connected to the PHY 52a belong to the disconnection zone Z4.

After disconnecting the HDD 4a from the server 3A, the manager 6 updates the server/drive connection table T3 according to the disconnection process of the HDD 4a (step S14 of FIGS. 18 and 20). In other words, the manager 6 deletes the drive ID "0-0-0-0" associated with the server ID "0" in the server/drive connection table T3 (see the table T3 of FIGS. 20 and 23). Thereafter, the manager 6 causes the process to proceed to step S15 of FIG. 21.

[3-2] Copy Target Server Selection Process

Next, a copy target server selection process performed by the object storage system 1 according to the present embodiment will be described according to a flowchart illustrated in FIG. 21 (steps S15 to S18) with reference to FIGS. 22 and 23. FIG. 22 illustrates a node configuration of the system 1 corresponding to a process of FIG. 21, and FIG. 23 is a diagram for describing a process on a the tables T3 and T4 corresponding to the process of FIG. 21.

Figure 21:
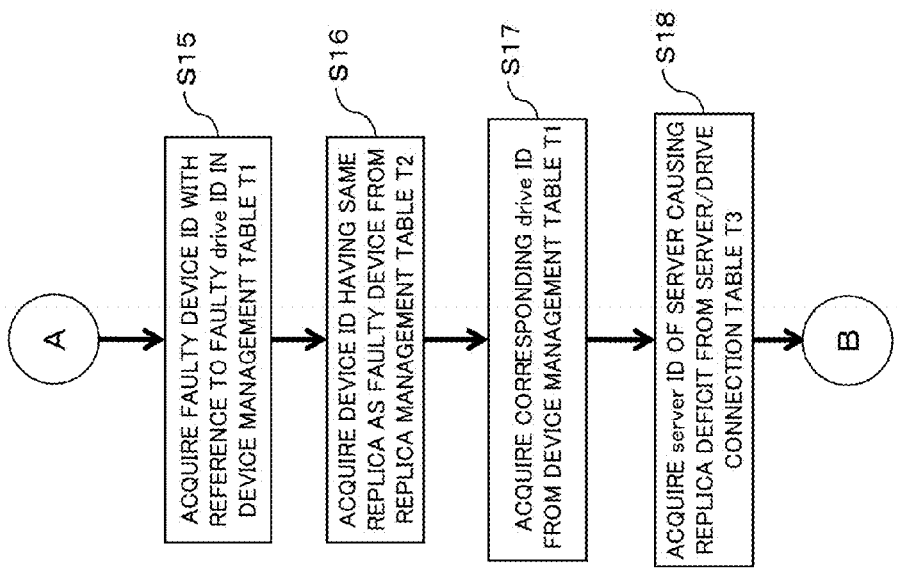
FIGS. 21 and 22 are flowcharts for describing a replica redundancy restoration process (copy target server selection process) performed by the object storage system according to the present embodiment.
Figure 22:
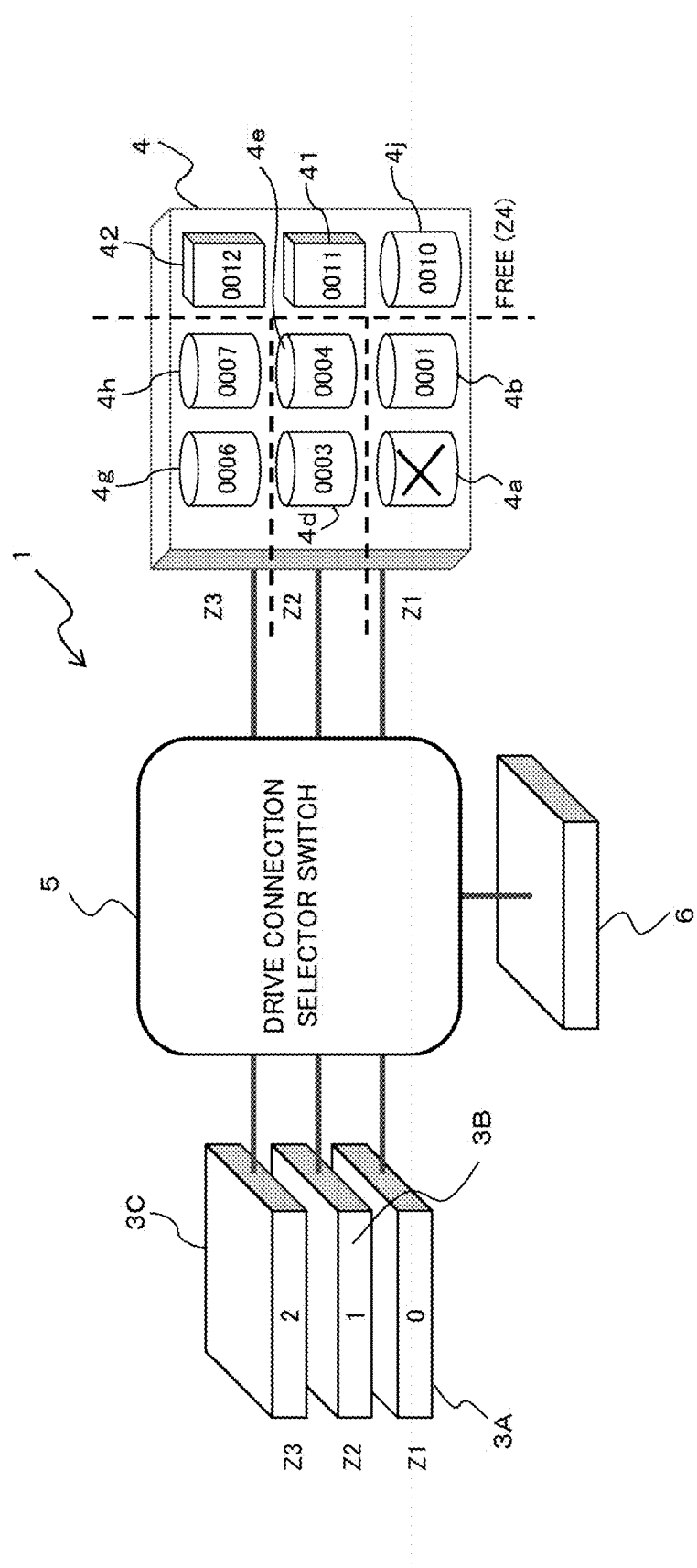
Figure 23:
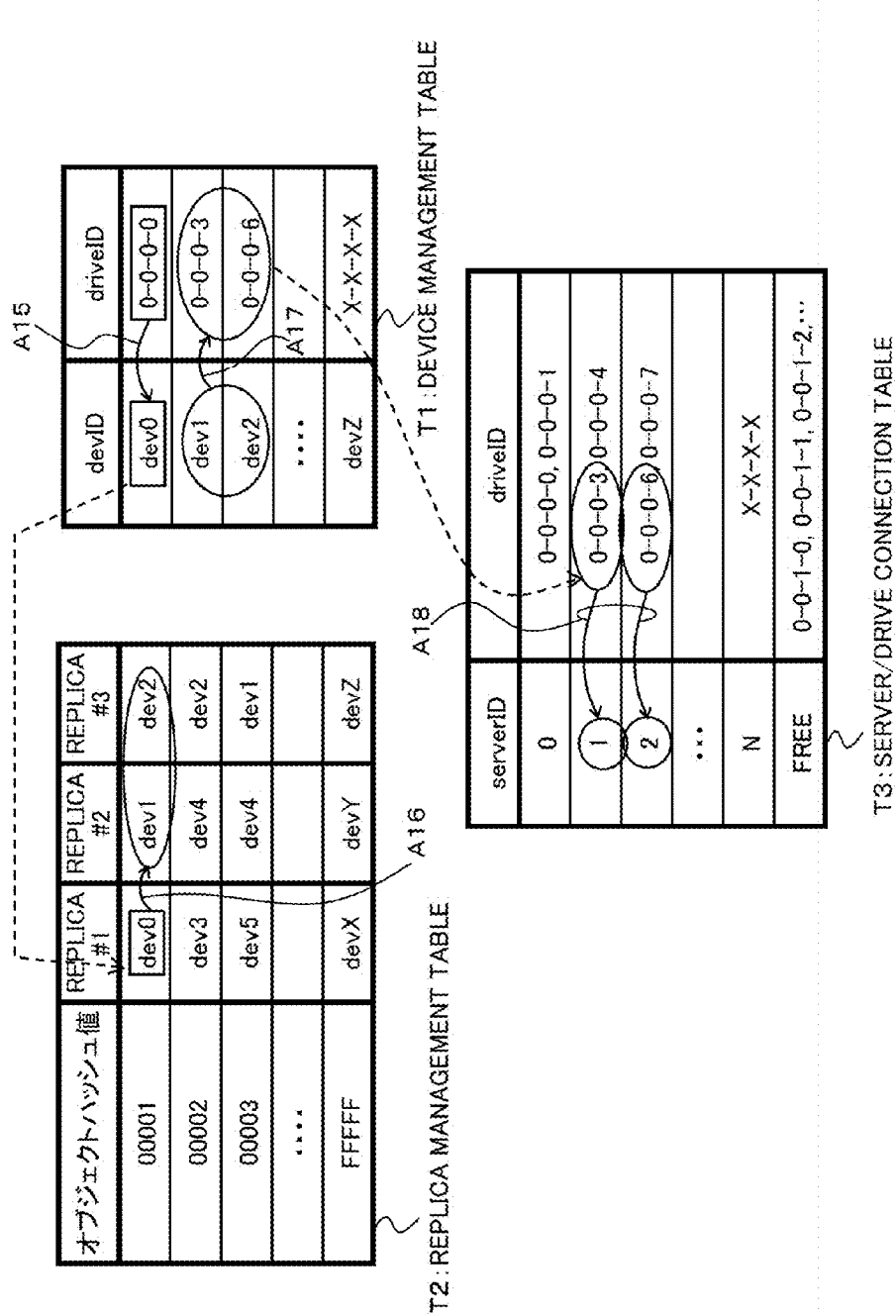
FIG. 23 is a diagram for describing a replica redundancy restoration process (copy target server selection process) performed by the object storage system according to the present embodiment.

In step S15 of FIG. 21, after deleting the faulty drive ID "0-0-0-0" in step S14, the manager 6 collates and searches the device management table T1 using the faulty drive ID "0-0-0-0" as a key, and acquires the faulty device ID "dev0" corresponding to the faulty drive ID "0-0-0-0" (see an arrow A15 of FIG. 23).

Further, the manager 6 collates and searches the replica management table T2 using the acquired faulty device ID "dev0" and acquires IDs "dev1" and "dev2" of devices holding the same replica as the replica held in the HDD 4a that is the faulty device (see step S16 of FIG. 21 and an arrow A16 of FIG. 23).

Further, the manager 6 collates and searches the device management table T1 using the acquired device IDs "dev1" and "dev2" as a key and acquires the drive IDs "0-0-0-3" and "0-0-0-6" associated with the devices holding the same replica as the replica held in the faulty HDD 4a (see step S17 of FIG. 21 and an arrow A17 of FIG. 23).

Then, the manager 6 collates and searches the server/drive connection table T3 using the acquired drive IDs "0-0-0-3" and "0-0-0-6" and acquires IDs "1" and "2" of two servers in which a replica was lost (see step S18 of FIG. 21 and an arrow A18 of FIG. 23). Here, a "server in which a replica was lost" refers to a server that has held a replica whose redundancy was changed from 3 to 2. Thereafter, the manager 6 causes the process to proceed to step S19 of FIG. 24.

[3-3] SSD Selection/Connection Process

Next, an SSD selection/connection process performed by the object storage system 1 according to the present embodiment will be described according to a flowchart (steps S19 to S22) illustrated in FIG. 24 with reference to FIGS. 25 and 26. FIG. 25 is a node configuration of the system 1 corresponding to a process of FIG. 24, and FIG. 26 is a diagram for describing a process on the tables T3 and T4 corresponding to the process of FIG. 25.

Figure 24:
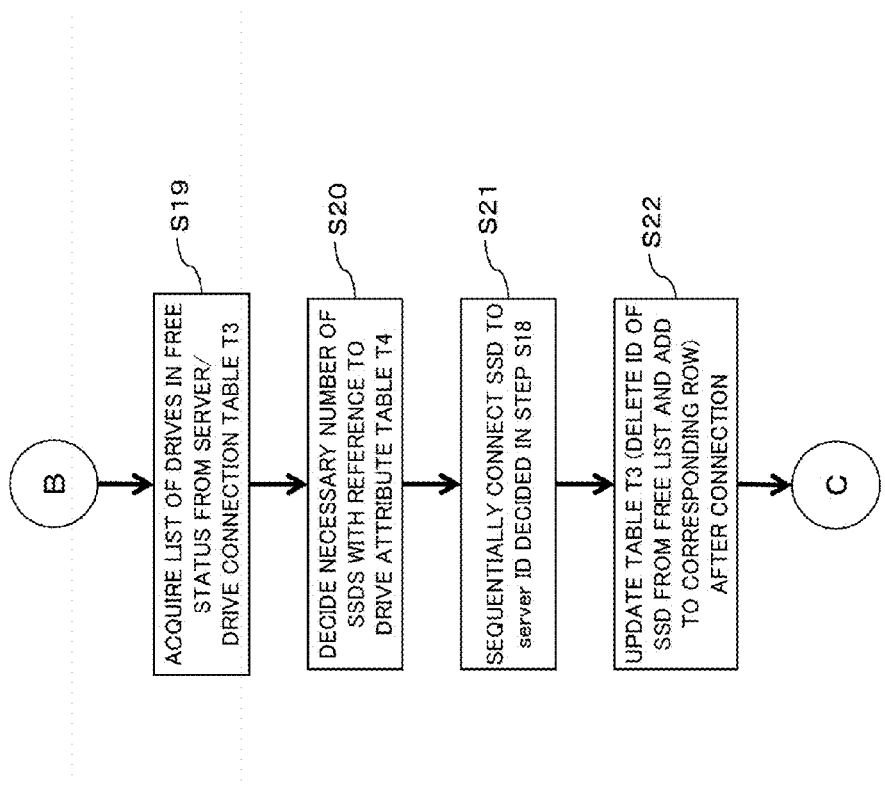
FIG. 24 is a flowchart for describing a replica redundancy restoration process (SSD selection/connection process) performed by the object storage system according to the present embodiment.
Figure 25:
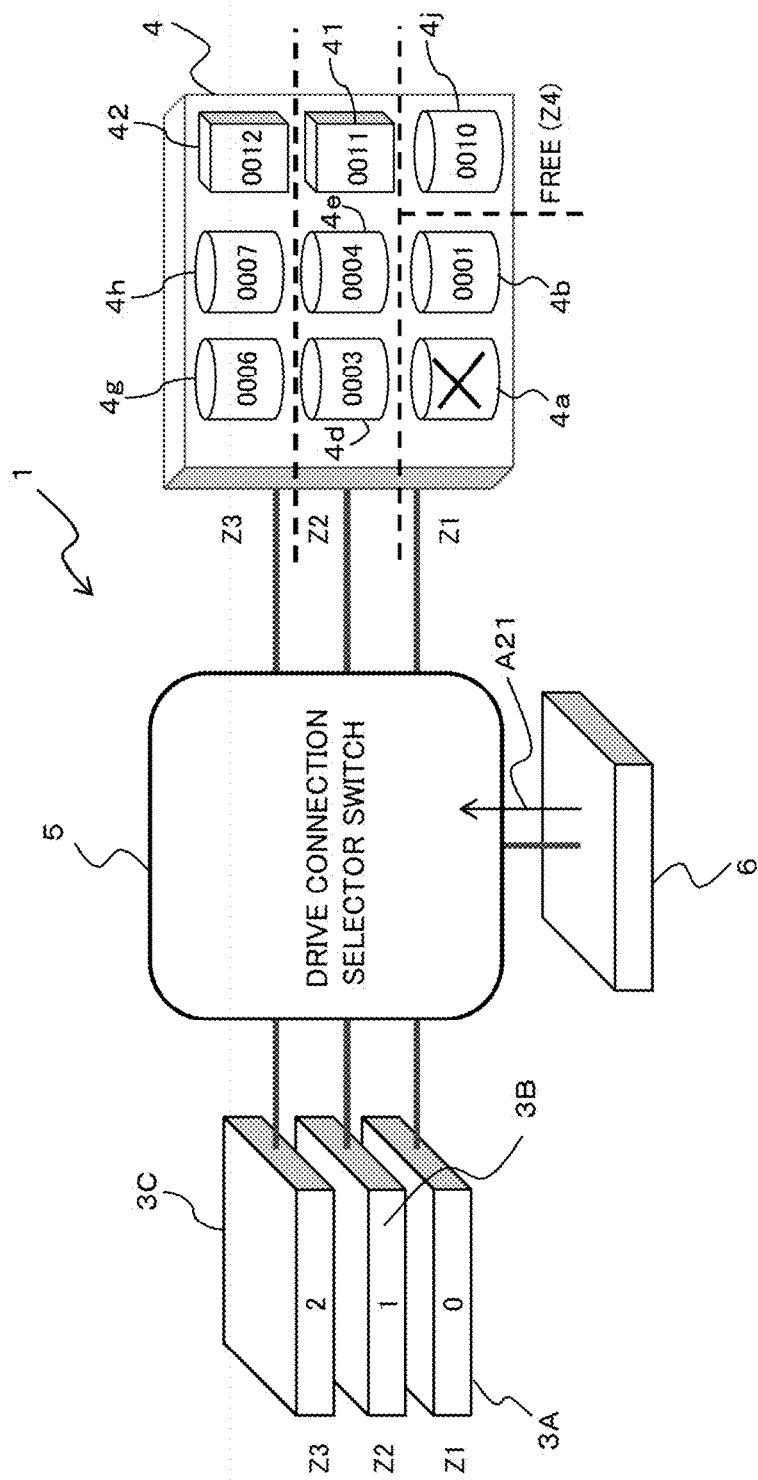
FIGS. 25 and 26 are diagrams for describing a replica redundancy restoration process (SSD selection/connection process) performed by the object storage system according to the present embodiment.
Figure 26:
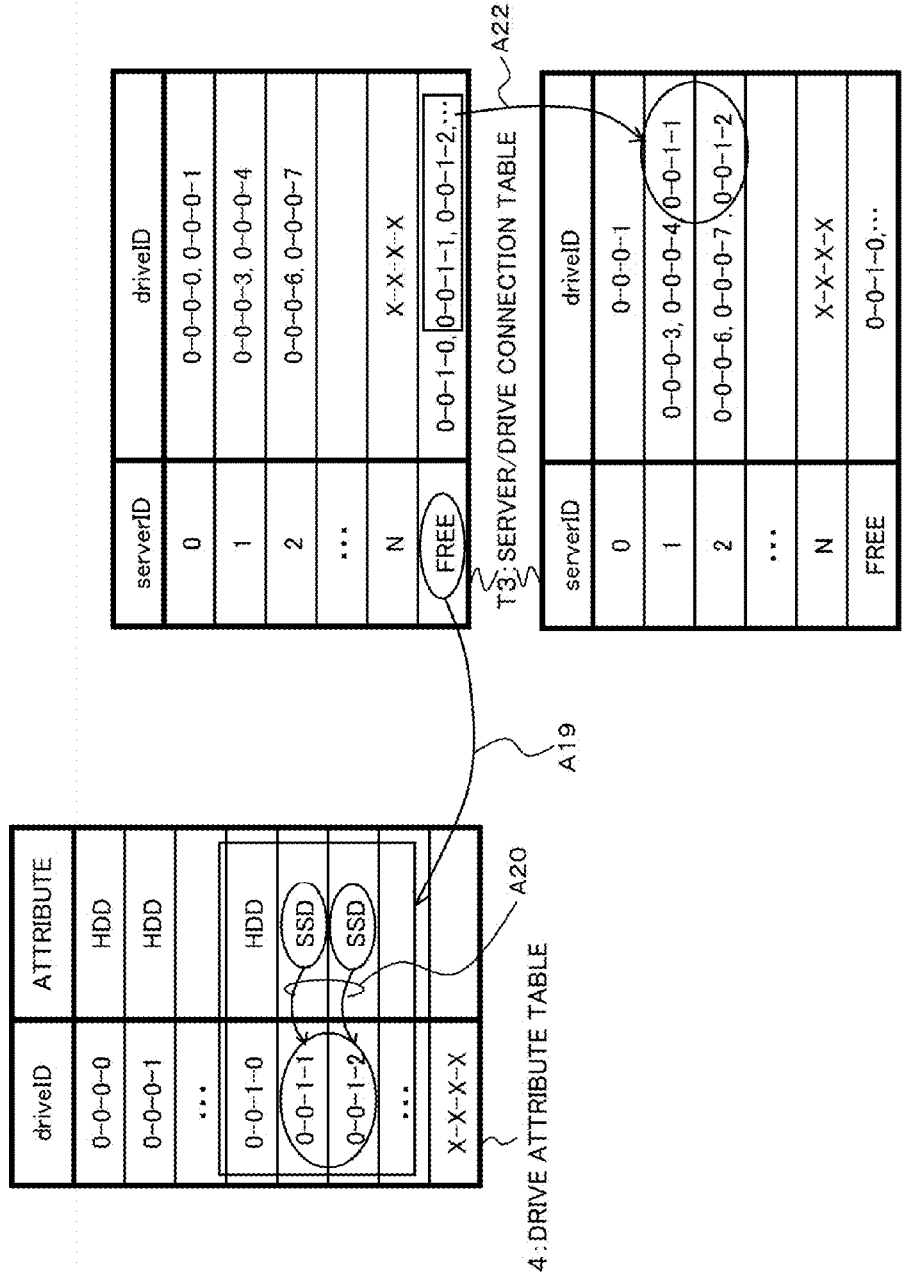

In step S19 of FIG. 24, the manager 6 acquires a list of drive IDs in the free state from the server/drive connection table T3 (see an arrow A19 of FIG. 26).

The manager 6 compares the acquired list of the drive IDs with the drive attribute table T4, and decides a necessary number of SSDs for data copy (see step S20 of FIG. 24 and an arrow A20 of FIG. 26). At this time, since the number of the server IDs acquired in step S18 of FIG. 21 is 2, the two SSDs 41 and 42 having the drive IDs "0-0-1-1" and "0-0-1-2" are selected and decided as an SSD for data copy.

Further, the manager 6 changes the zoning setting in the SAS expander 5 through the USB interface, and connects the SSDs 41 and 42 having the drive IDs "0-0-1-1" and "0-0-1-2" decided in step S20 of FIG. 24 to the servers 3B and 3C of the server IDs "1" and "2" acquired in step S18 of FIG. 21 (see step S21 of FIG. 24 and an arrow A21 of FIG. 25). At this time, as the zoning setting is changed, in the SAS expander 5, the PHY 51b connected to the server 3B is connected with the PHY 52k connected to the SSD 41, and the PHY 51c connected to the server 3C is connected with the PHY 52l connected to the SSD 42. As a result, as illustrated in FIG. 25, the servers 3B and 3C holding the same replica as the replica stored in the faulty HDD 4a newly exclusively use the SSDs 41 and 42.

After connecting the SSDs 41 and 42 with the servers 3B and 3C, the manager 6 updates the server/drive connection table T3 according to the new connection (step S22 of FIG. 24). In other words, the manager 6 deletes the drive IDs "0-0-1-1" and "0-0-1-2" associated with the server ID "free" from the line of the server ID "free" in the server/drive connection table T3. Then, the manager 6 moves and adds the drive IDs "0-0-1-1" and "0-0-1-2" to the server IDs "1" and "2", respectively (see an arrow A22 of FIG. 26). Thereafter, the manager 6 causes the process to proceed to step S23 of FIG. 27.

[3-4] Process of Copying Replica to SSD

Next, a process of copying a replica to an SSD which is performed by the object storage system 1 according to the present embodiment will be described according to a flowchart (steps S23 to S25) illustrated in FIG. 27 with reference to FIGS. 28 and 29. FIG. 28 is a diagram illustrating a node configuration of the system 1 corresponding to a process of FIG. 27, and FIG. 29 is a diagram for describing a replica copy process corresponding to the process (step S24) of FIG. 27.

Figure 27:
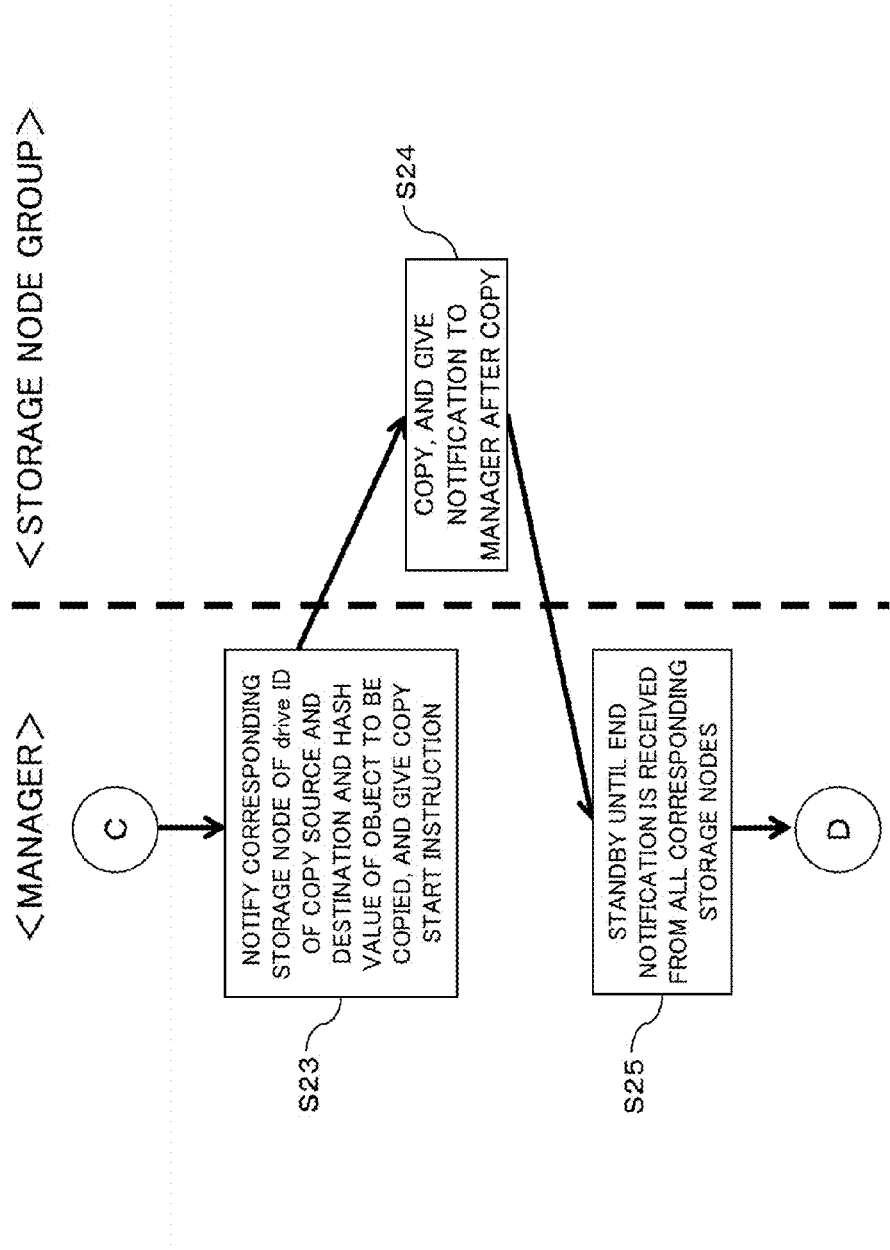
FIG. 27 is a flowchart for describing a replica redundancy restoration process (a process of copying a replica to an SSD) performed by the object storage system according to the present embodiment.
Figure 28:
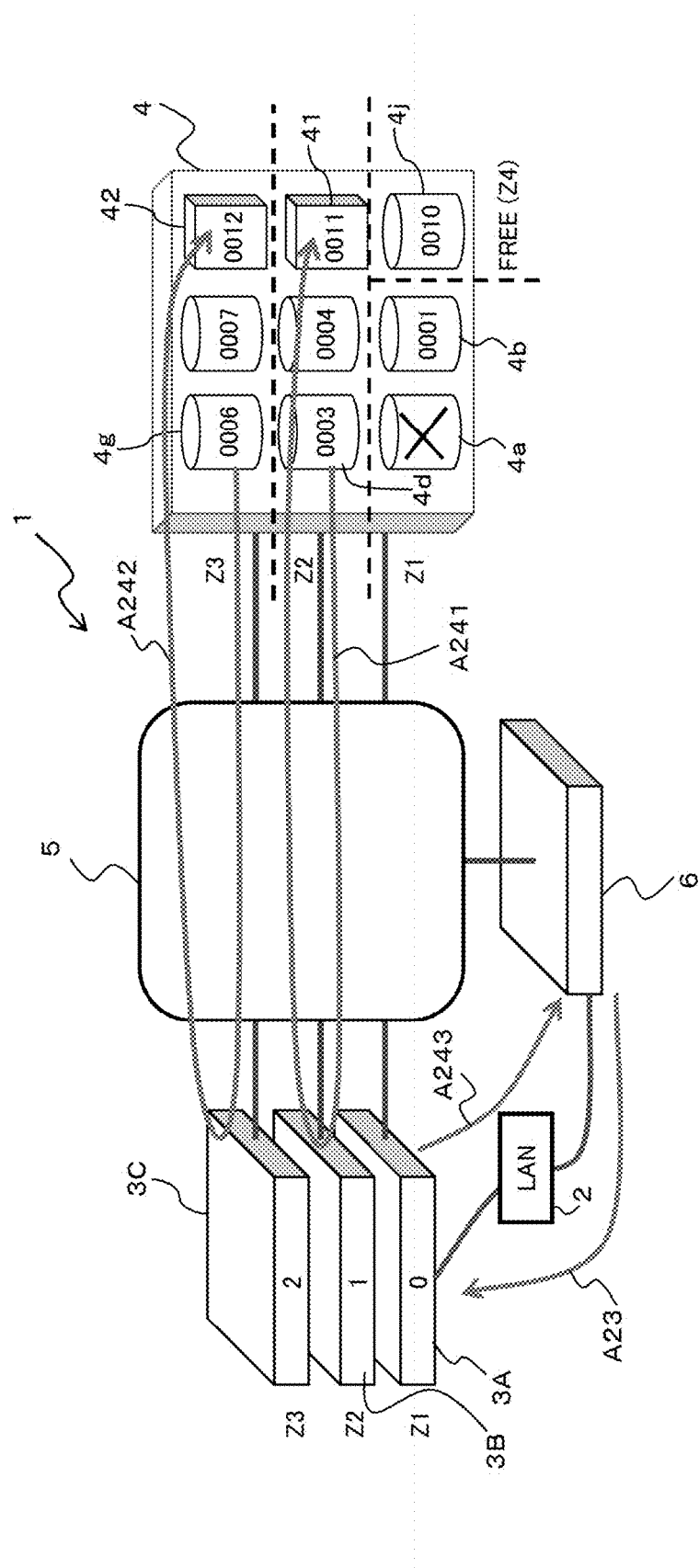
FIGS. 28 and 29 are diagrams for describing a replica redundancy restoration process (a process of copying a replica to an SSD) performed by the object storage system according to the present embodiment.

In step S23 of FIG. 27, the manager 6 gives a copy start instruction to the storage nodes to which the servers 3B and 3C belong via the LAN 2 (see an arrow A23 of FIG. 28). At this time, the manager 6 notifies the server 3B of the drive ID "0-0-0-3" the copy source, the drive ID "0-0-1-1" of the copy destination, and the hash value (the upper n-bit value) of the object to be copied. Similarly, the manager 6 notifies the server 3C of the drive ID "0-0-0-6" the copy source, the drive ID "0-0-1-2" of the copy destination, and the hash value (the upper n-bit value) of the object to be copied. The hash value (the upper n-bit value) of the object to be copied is obtained by collating and searching the replica management table T2 using the device ID "dev0" of the faulty HDD 4*a* as a key.

In each of the servers 3B and 3C that have received the copy instruction, the CPU 31 performs the process of copying the replica to the SSDs 41 and 42 (step S24 of FIG. 27). At this time, in the server 3B, the replica having the designated hash value (the upper n-bit value) is copied from the HDD 4*d* (dev1) having the drive ID "0-0-0-3" to the SSD 41 having the drive ID "0-0-1-1" through the switch 5 and the CPU 31 (see an arrow A241 of FIG. 28). Similarly, in the server 3C, the replica having the designated hash value (the upper n-bit value) is copied from the HDD 4*g* (dev2) having the drive ID "0-0-0-6" to the SSD 42 having the drive ID "0-0-1-2" through the switch 5 and the CPU 31 (see an arrow A242 of FIG. 28).

Figure 29:
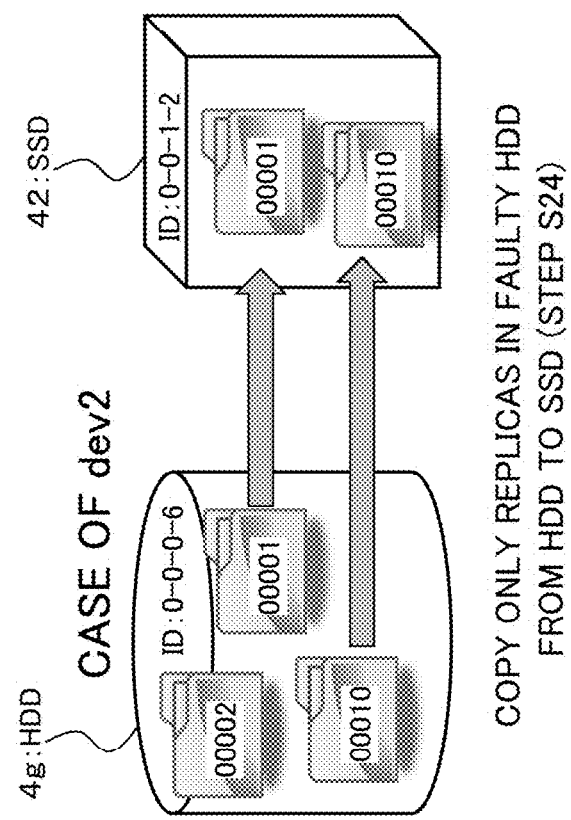

As illustrated in FIG. 29, the copy process from the HDD 4*g* (dev2) to the SSD 42 is performed by setting only the replica present in the faulty HDD 4*a* as a target. In other words, in the example illustrated in FIG. 29, replicas having hash values (upper n-bit values) of 00001 and 00010 are stored in the faulty HDD 4*a* and thus set as a copy target, a replica having a hash value (upper n-bit value) of 00002 is not stored in the faulty HDD 4*a* and thus not set as a copy target.

After ending the copy process, each CPU 31 gives an end notification to the manager 6 via the LAN 2 (see step S24 of FIG. 27 and an arrow A243 of FIG. 28).

Figure 30:
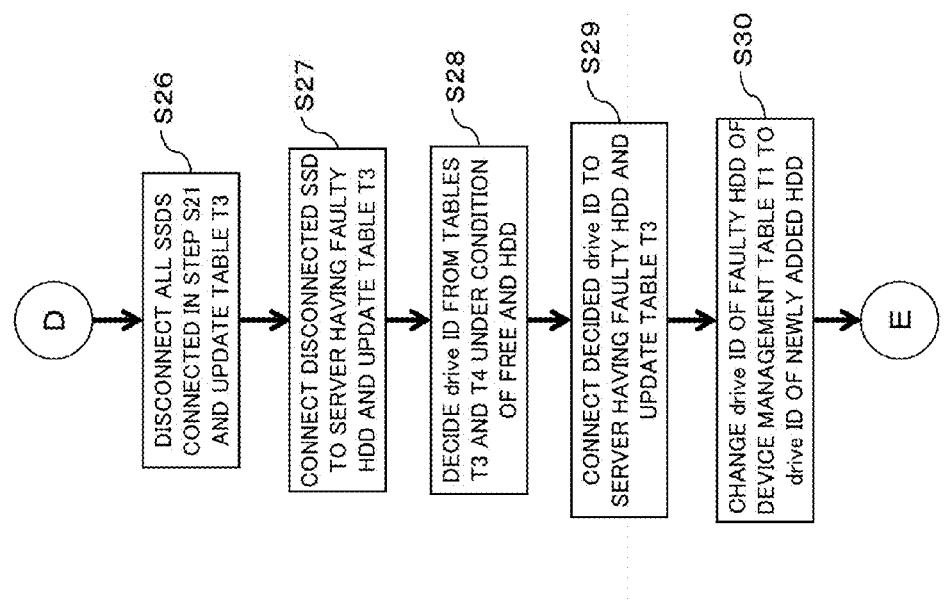
FIG. 30 is a flowchart for describing a replica redundancy restoration process (an SSD movement process and a backup HDD addition process) performed by the object storage system according to the present embodiment.

The manager 6 is on standby until the end notifications are received from all the storage nodes to which the servers 3B and 3C belong (step S25 of FIG. 27), and when the end notifications are received from all the storage nodes, the process proceeds to step S26 of FIG. 30. At this time, the replica number (the replica redundancy) is 3 and the same as before the drive failure occurs, and thus a risk of object loss is avoided.

[3-5] SSD Movement Process and Backup HDD Addition Process

Figure 31:
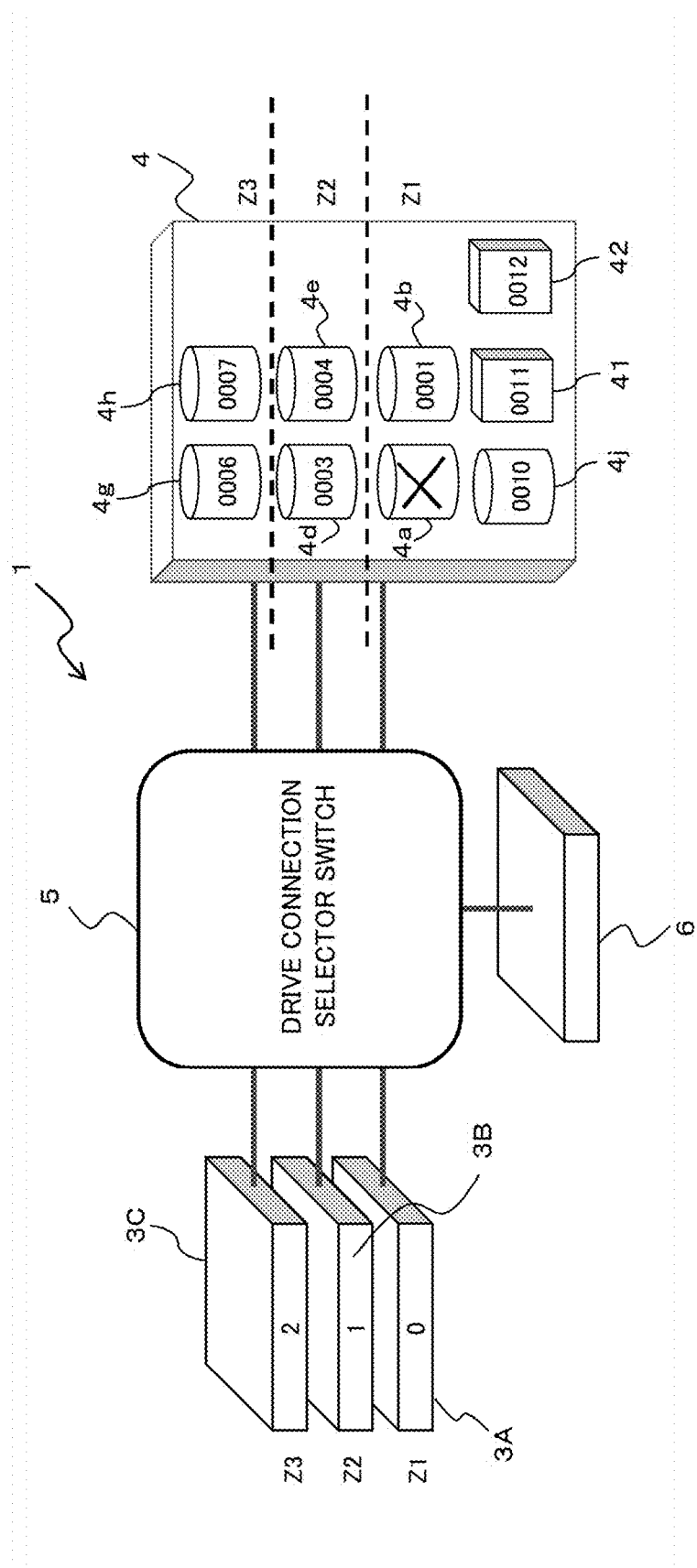

Next, an SSD movement process and a backup HDD addition process performed by the object storage system 1 according to the present embodiment will be described according to a flowchart (steps S26 to S30) illustrated in FIG. 30 with reference to FIGS. 31 and 32. FIG. 31 is a node configuration of the system 1 corresponding to a process of FIG. 30, and FIG. 32 is a diagram for describing a process on the tables T1, T3, and T4 corresponding to the process of FIG. 30.

In step S26 of FIG. 30, the manager 6 changes the zoning setting in the SAS expander 5 through the USB interface, and disconnects the SSDs 41 and 42 connected to the servers 3B and 3C in step S21 of FIG. 24 from the servers 3B and 3C. At this time, as the zoning setting is changed, in the SAS expander 5, the PHY 51*b* connected to the server 3B is disconnected from the PHY 52*k* connected to the SSD 41, and the PHY 51*c* connected to the server 3C is disconnected from the PHY 52*l* connected to the SSD 42. After disconnecting the SSDs 41 and 42 from the servers 3B and 3C, the manager 6 updates the server/drive connection table T3 according to the disconnection process of the SSDs 41 and 42. In other words, the manager 6 deletes the drive IDs "0-0-1-1" and "0-0-1-2" associated with the server IDs "1" and "2" in the server/drive connection table T3.

Then, in step S27 of FIG. 30, the manager 6 changes the zoning setting in the SAS expander 5 through the USB interface, and connects the SSDs 41 and 42 disconnected from the servers 3B and 3C to the server 3A having the faulty HDD 4*a*. At this time, as the zoning setting is changed, in the SAS expander 5, the PHY 51*a* connected to the server 3A is connected to the PHYs 52*k* and 52*l* connected to the SSDs 41 and 42. As a result, as illustrated in FIG. 31, the server 3A newly exclusively uses the SSDs 41 and 42. After connecting the SSDs 41 and 42 with the server 3A, the manager 6 updates the server/drive connection table T3 according to the connection process of the SSDs 41 and 42. In other words, the manager 6 moves and adds the drive IDs "0-0-1-1" and "0-0-1-2" of the SSDs 41 and 42 to the line corresponding to the server ID "0" of the server 3A in the server/drive connection table T3 (an arrow A27 of FIG. 32). At this time, the node to which the server 3A belongs is logically restored to the state before the drive failure occurs.

Thereafter, step S28 of FIG. 30, the manager 6 searches a drive ID that is associated with the server ID "free" and has an attribute of HDD based on the server/drive connection table T3 and the drive attribute table T4. In the example illustrated in FIG. 32, the manager 6 decides "0-0-1-0" as a drive ID that is associated with the server ID "free" and has an attribute of HDD. The decided HDD of the drive ID "0-0-1-0" is the unused HDD 4*j*.

Then, in step S29 of FIG. 30, the manager 6 changes the zoning setting in the SAS expander 5 through the USB interface, and connects the unused HDD 4*j* with the server 3A having the faulty HDD 4*a*. At this time, as the zoning setting is changed, in the SAS expander 5, the PHY 51*a* connected to the server 3A is connected with the PHY 52*j* connected to the HDD 4*j*. As a result, as illustrated in FIG. 31, the server 3A newly exclusively use the HDD 4*j*. After connecting the HDD 4*j* with the server 3A, the manager 6 updates the server/drive connection table T3 according to the connection process of the HDD 4*j*. In other words, the manager 6 moves the drive ID "0-0-1-0" of the HDD 4*j* from the line corresponding to the server ID "free" and adds the drive ID "0-0-1-0" of the HDD 4*j* to the line corresponding to the server ID "0" of the server 3A in the server/drive connection table T3 (see an arrow A29 of FIG. 32).

Further, the manager 6 changes the drive ID "0-0-0-0" of the faulty HDD 4*a* associated with the device ID "dev0" to the drive ID "0-0-1-0" of the HDD 4*j* newly added in step S29 in the device management table T1 (see step S30 of FIG. 30 and an arrow A30 of FIG. 32). Thereafter, the manager 6 causes the process to proceed to step S31 of FIG. 33.

[3-6] Process of Copying Replica to Backup HDD

Next, a process of copying a replica to a backup HDD which is performed by the object storage system 1 according to the present embodiment will be described according to a flowchart (steps S31 to S33) illustrated in FIG. 33 with reference to FIGS. 34 to 36. FIG. 34 is a node configuration of the system 1 corresponding to a process of FIG. 33, FIG. 35 is a diagram for describing a replica copy process corresponding to a process (step S32) of FIG. 34, and FIG. 36 is a diagram for describing a process on the table T3 corresponding to a process (step S33) of FIG. 34.

Figure 33:
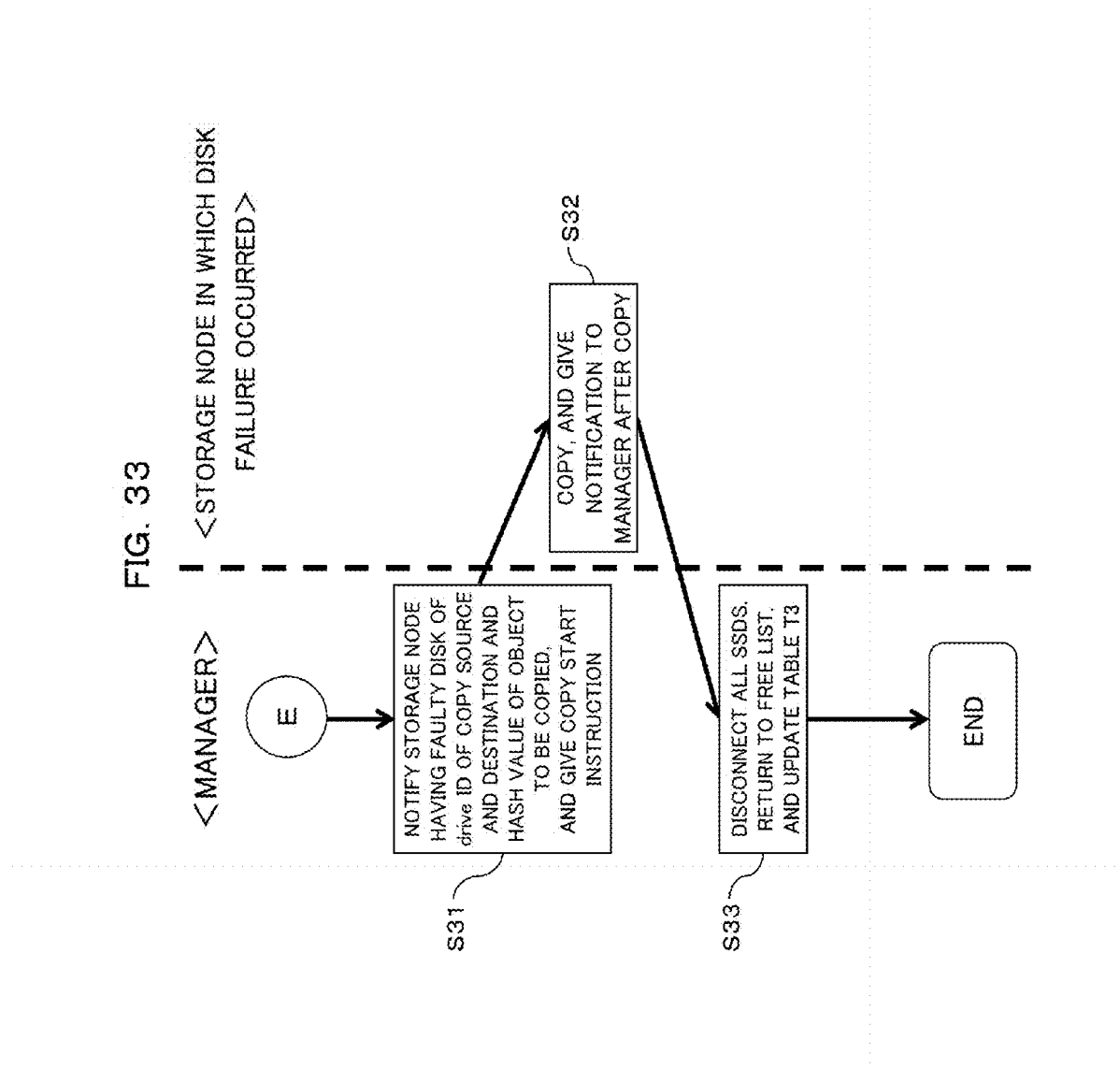
FIG. 33 is a flowchart for describing a replica redundancy restoration process (a process of copying a replica to a backup HDD) performed by the object storage system according to the present embodiment.
Figure 34:
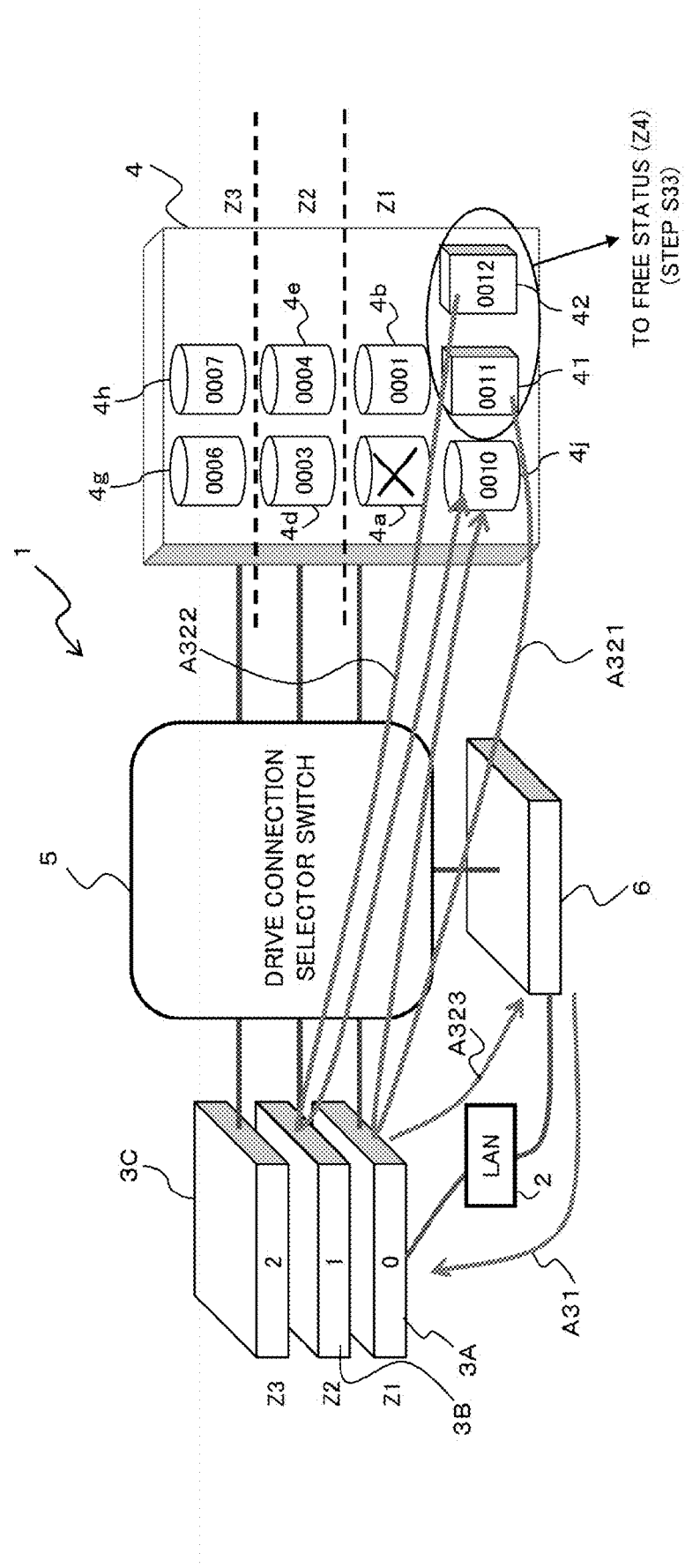
Figure 35:
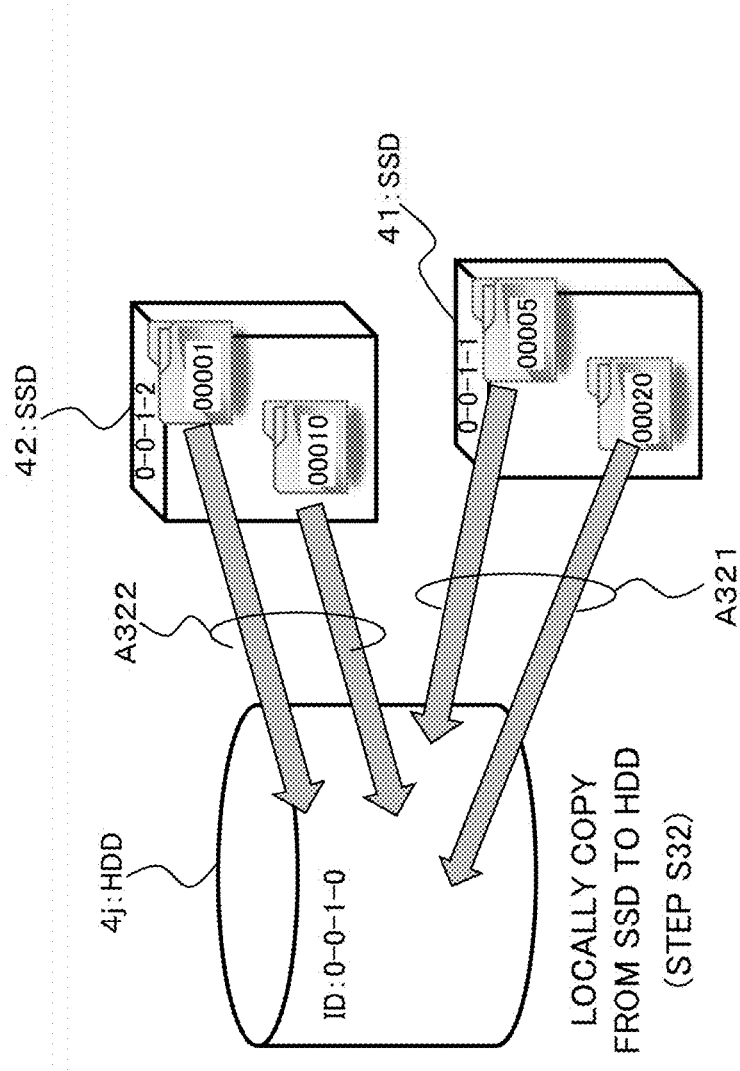
Figure 37:
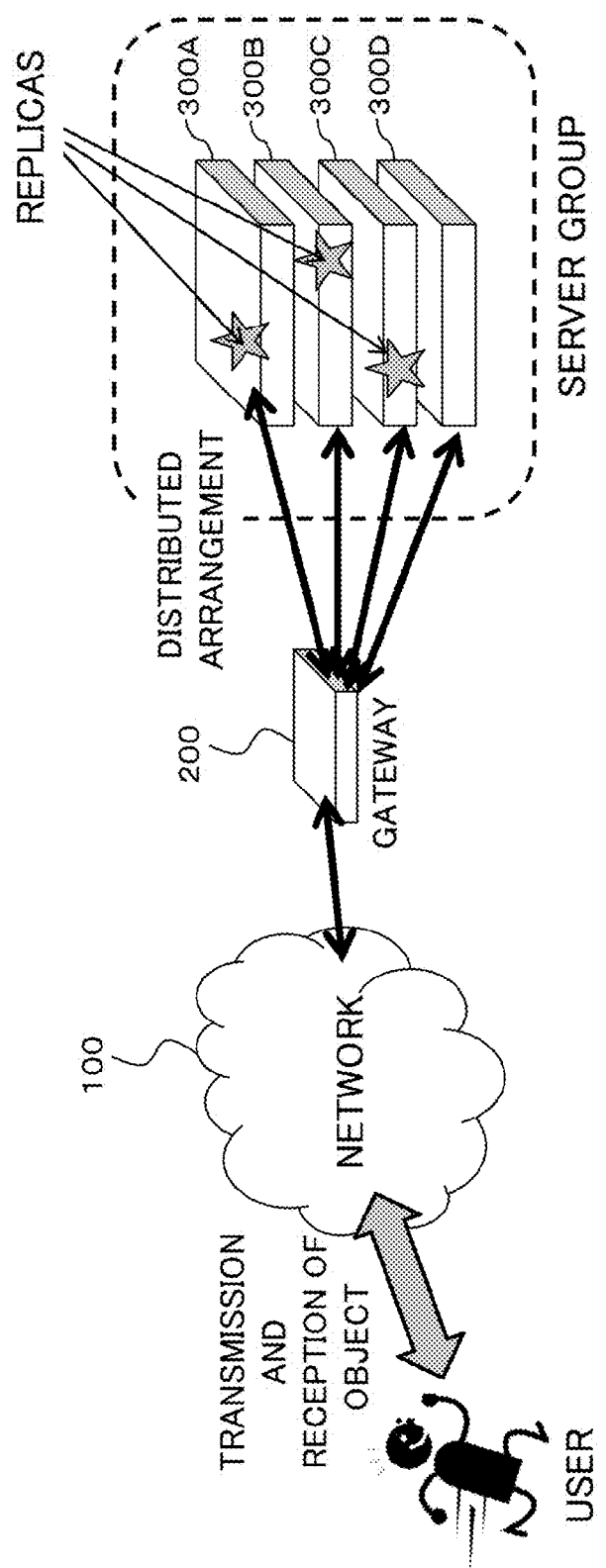
FIG. 37 is a diagram for describing a configuration of an object storage system and a replica distribution arrangement.
Figure 38:
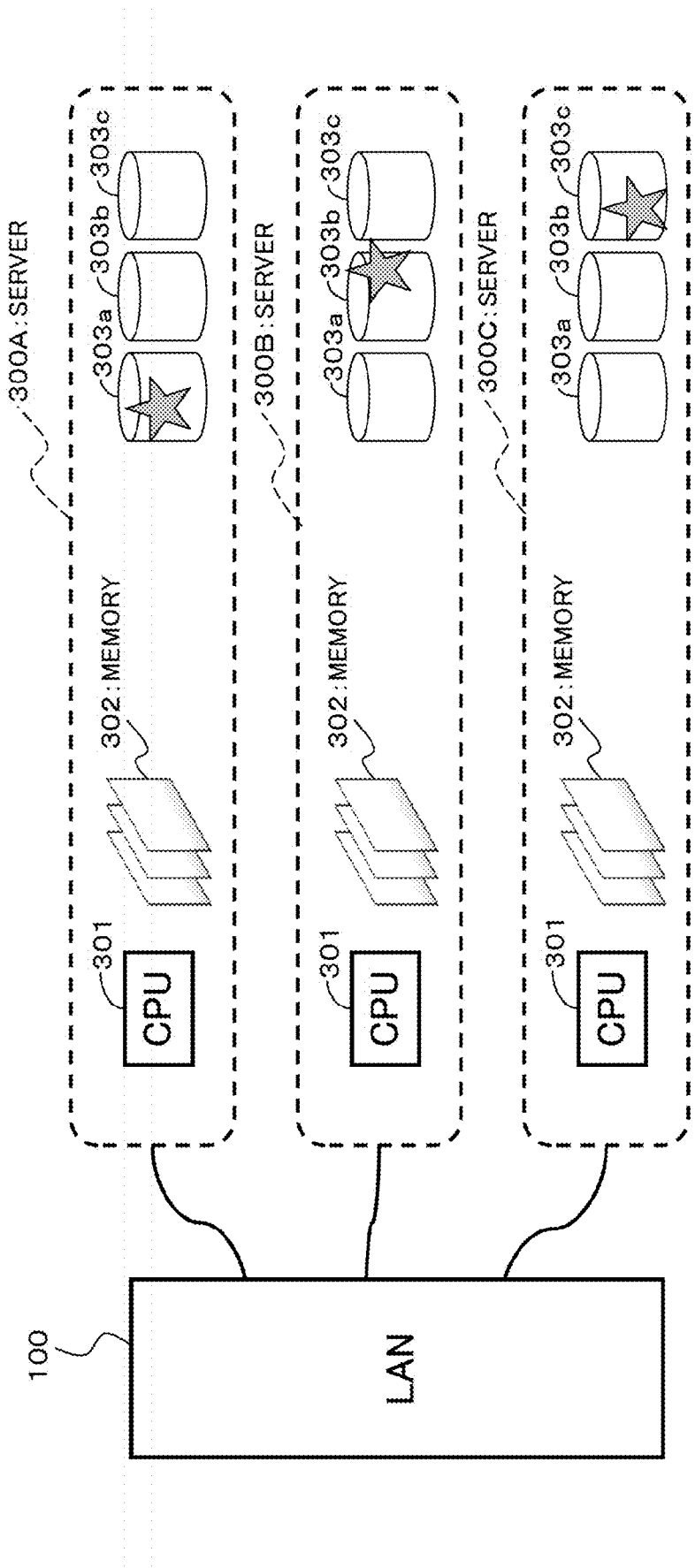
FIGS. 38 and 39 are diagrams for describing a process when a drive failure occurs in the object storage system illustrated in FIG. 37.
Figure 39:
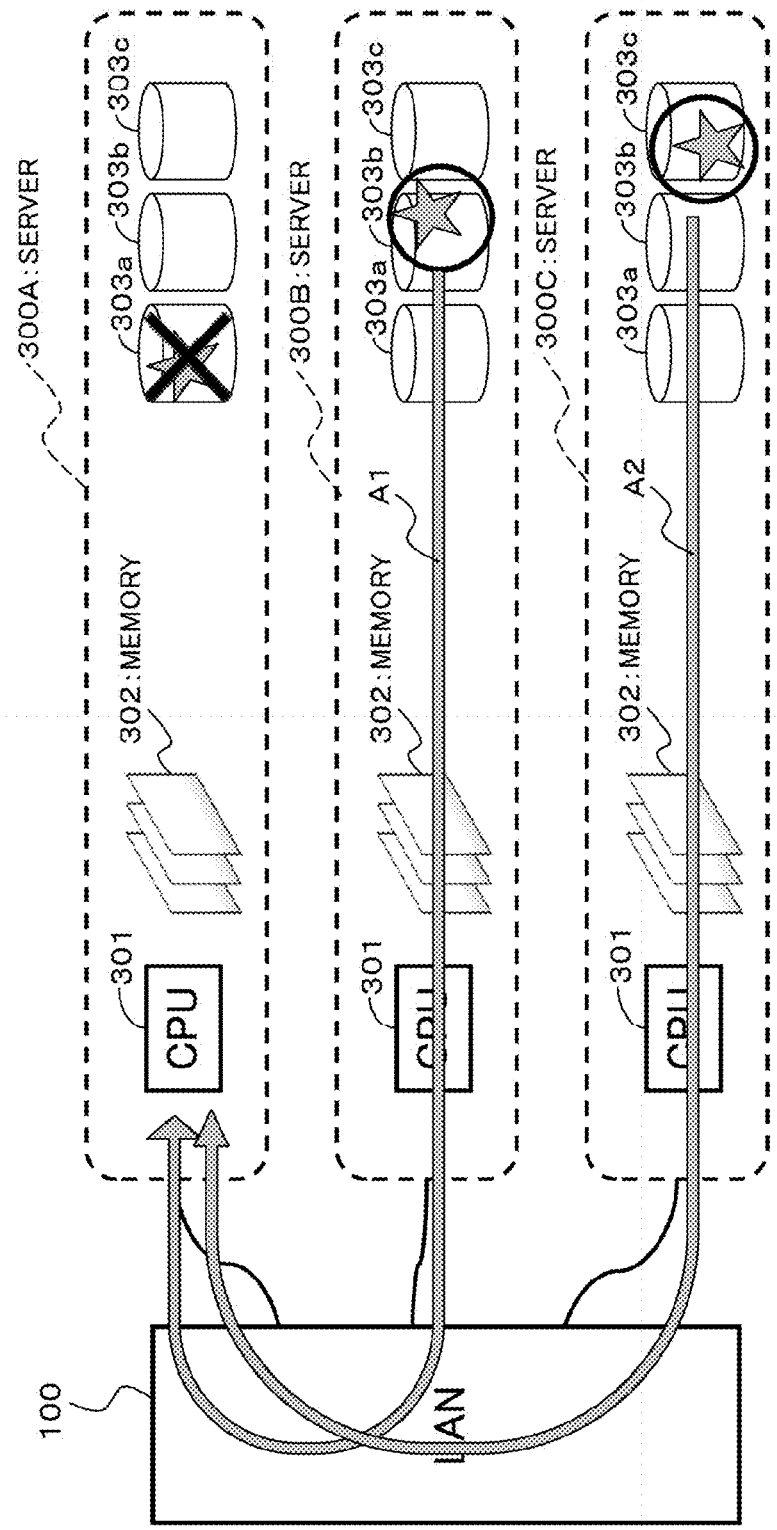

In step S31 of FIG. 33, the manager 6 gives a copy start instruction to a storage node to which the server 3A having the faulty HDD belong via the LAN 2 (see an arrow A31 of FIG. 34). At this time, the manager 6 notifies the server 3A of the drive IDs "0-0-1-1" and "0-0-1-2" of the copy source, the drive ID "0-0-1-0" of the copy destination, and the hash value (the upper n-bit value) of the object to be copied. The hash value (the upper n-bit value) of the object to be copied is the same as the hash value notified in step S23 of FIG. 27 and is obtained by collating and searching the replica management table T2 using the device ID "dev0" of the faulty HDD 4a as a key.

In the server 3A that has received the copy instruction, the CPU 31 performs the process of copying the replica from the SSDs 41 and 42 to the HDD 4j (step S32 of FIG. 33). At this time, the replica having the designated hash value (the upper n-bit value) is copied from the SSD 41 having the drive ID "0-0-1-1" to the HDD 4j (dev0) having the drive ID "0-0-1-0" through the switch 5 and the CPU 31 (see an arrow A321 of FIGS. 34 and 35). Similarly, the replica having the designated hash value (the upper n-bit value) is copied from the SSD 42 having the drive ID "0-0-1-2" to the HDD 4j (dev0) having the drive ID "0-0-1-0" through the switch 5 and the CPU 31 (see the arrow A322 of FIGS. 34 and 35).

After ending the copy process, the CPU 31 of the server 3A gives an end notification to the manager 6 via the LAN 2 (see step S32 of FIG. 33 and an arrow A323 of FIG. 34).

Then, in step S33 of FIG. 33, upon receiving the end notification from the storage node to which the server 3A belongs, the manager 6 changes the zoning setting in the SAS expander 5 through the USB interface, and disconnects the SSDs 41 and 42 from the server 3A. At this time, as the zoning setting is changed, in the SAS expander 5, the PHY 51a connected to the server 3A is disconnected from the PHYs 52k and 52l connected to the SSDs 41 and 42. After disconnecting the SSDs 41 and 42 from the servers 3B and 3C, the manager 6 updates the server/drive connection table T3 according to the disconnection process of the SSDs 41 and 42. In other words, as illustrated in FIG. 36, the manager 6 returns the drive IDs "0-0-1-1" and "0-0-1-2" associated with the server ID "0" to the section of the server ID "free" in the server/drive connection table T3. As a result, the SSDs 41 and 42 returns to the free state, that is, the disconnected state in which the SSDs 41 and 42 are not connected to any of the servers 3A to 3C. At this time, one extra drive for a backup changes from the unused state to the used state, and the object storage system 1 is restored to the same state before the drive failure occurs.

[4] Conclusion

According to the object storage system 1 according to the present embodiment, when a drive failure occurs in the server 3A of the server cluster 3 and so the replica number is reduced, the servers 3B and 3C individually copy replicas to the SSDs 41 and 42 for restoration. Then, after copying, the SSDs 41 and 42 are connected to the server 3A of the restoration target through the switch (drive connection selector device) 5, and so a reduction in the replica number is restored without using the LAN 2 between the servers.

Since the replica redundancy restoration process is performed using the switch 5 as described above, the replica redundancy is restored without affecting the bandwidth of the LAN 2, and it is possible to avoid a situation in which the restoration process and the user process compete with each other and hinder each other. Thus, even when a load in the LAN 2 is large, the replica redundancy restoration process is not affected by the LAN 2. For this reason, even in the configuration in which the bandwidth of the LAN 2 is limited, it is possible to rapidly restore a reduction in the replica number, and even when the HDD 4a being used is faulty, it is possible to immediately return a distribution arrangement situation of a replica to an initial ideal allocation.

Further, as an SSD is used as the storage device for data replication, the replica redundancy restoration process can be performed at a high speed. In the present embodiment, it is possible not only to effectively use a small number of expensive devices but also to perform the replica redundancy restoration process at a high speed at a low cost as possible by equipping the two SSDs 41 and 42, for example, as the storage device for data replication.

[5] Others

The exemplary embodiment of the present invention have been described above, but the present invention is not limited to a related specific embodiment, and various modification or changes can be made within the scope not departing from the gist of the present invention.

All or some of the functions of the control device 6 serving as the manager server or the front end server are implemented by executing a certain application program (control program) through a computer (for example, a CPU, an information processing apparatus, or various kinds of terminals).

The application program is provided in the form in which the application program is recorded in a computer-readable recording medium such as a flexible disk, a CD (CD-ROM, CD-R, CD-RW, or the like), a DVD (DVD-ROM, DVD-RAM, DVD-R, DVD-RW, DVD+R, DVD+RW, or the like), or a Blu-ray disc. In this case, the computer reads the program from the recording medium, transfers the program to be stored in an internal storage device or an external storage device or, and then uses the program.

According to an embodiment, a redundancy of replicated data pieces can be restored without affecting a bandwidth of a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. An information processing apparatus, comprising:
a plurality of storage devices;
a plurality of processing apparatuses;
a switch device that switches a connection status between the plurality of storage devices and the plurality of processing apparatuses; and
a control device that controls the switch device and the plurality of processing apparatuses such that, when one of replicated data pieces stored in a first storage device connected to a first processing apparatus among one or more storage devices connected to each of two or more different processing apparatuses among the plurality of processing apparatuses is lost, a third storage device, which is not connected to any of processing apparatuses, is connected to a second processing apparatus connected to a second storage device storing the one of replicated data pieces, and the one of replicated data pieces stored in the second storage device is copied to the third storage device, and the third storage device to which the one of replicated data pieces is copied is connected to the first processing apparatus instead of the first storage device.

2. The information processing apparatus according to claim 1,
wherein the control device connects each of the plurality of processing apparatuses with some of the plurality of storage devices through the switch device to manage the plurality of storage devices and the plurality of processing apparatuses as a plurality of nodes including one processing apparatus among the plurality of processing apparatuses and one or more storage devices among the plurality of storage devices,
the first storage device and the second storage device are included in a first node and a second node, respectively, among the plurality of nodes,
the control device controls the switch device such that an unused storage device for data replication among the plurality of storage devices is connected to the second processing apparatus serving as the one processing apparatus configuring the second node,
the control device controls the second processing apparatus such that the replicated data piece to be stored in the second storage device is copied to the storage device for data replication connected to the second processing apparatus through the switch device,
the control device controls the switch device such that the storage device for data replication to which the replicated data piece is copied is disconnected from the second processing apparatus, and connected to the first processing apparatus serving as the one processing apparatus configuring the first node,
the control device controls the switch device such that the third storage device included in the plurality of storage devices is connected to the first processing apparatus instead of the first storage device, and
the control device controls the first processing apparatus such that the replicated data piece stored in the storage device for data replication is stored in the third storage device connected to the first processing apparatus through the switch device.

3. The information processing apparatus according to claim 2,
wherein the control device controls the switch device such that, after the replicated data piece is stored in the third storage device, the storage device for data replication is disconnected from the first processing apparatus to return to an unused state.

4. The information processing apparatus according to claim 2,
wherein each of the first to third storage devices is a hard disk drive (HDD), and
the storage device for data replication is a solid state drive (SSD).

5. The information processing apparatus according to claim 1,
wherein the switch device is a serial attached small computer system interface (SCSI) (SAS) expander, and
the control device sets the one processing apparatus and the one or more storage devices belonging to each of the plurality of nodes by operating zoning information of the SAS expander.

6. A non-transitory computer-readable recording medium having stored therein a program for causing a computer to execute a process for controlling an information processing apparatus including a plurality of storage devices, a plurality of processing apparatuses, and a switch device that switches a connection status between the plurality of storage devices and the plurality of processing apparatuses, the process comprising:
controlling the switch device and the plurality of processing apparatuses such that, when one of replicated data pieces stored in a first storage device connected to a first processing apparatus among one or more storage devices connected to each of two or more different processing apparatuses among the plurality of processing apparatuses is lost, a third storage device, which is not connected to any of processing apparatuses, is connected to a second processing apparatus connected to a second storage device storing the one of replicated data pieces, and the one of replicated data pieces stored in the second storage device is copied to the third storage device, and the third storage device to which the one of replicated data pieces is copied is connected to the first processing apparatus instead of the first storage device.

7. The non-transitory computer-readable recording medium according to claim 6, the process further comprising:
connecting each of the plurality of processing apparatuses with some of the plurality of storage devices through the switch device to manage the plurality of storage devices and the plurality of processing apparatuses as a plurality of nodes including one processing apparatus among the plurality of processing apparatuses and one or more storage devices among the plurality of storage devices, the first storage device and the second storage device being included in a first node and a second node, respectively, among the plurality of nodes;
controlling the switch device such that an unused storage device for data replication among the plurality of storage devices is connected to the second processing apparatus serving as the one processing apparatus configuring the second node;
controlling the second processing apparatus such that the replicated data piece to be stored in the second storage device is copied to the storage device for data replication connected to the second processing apparatus through the switch device;
controlling the switch device such that the storage device for data replication to which the replicated data piece is copied is disconnected from the second processing apparatus, and connected to the first processing apparatus serving as the one processing apparatus configuring the first node;

controlling the switch device such that the third storage device included in the plurality of storage devices is connected to the first processing apparatus instead of the first storage device; and controlling the first processing apparatus such that the replicated data piece to be stored in the storage device for data replication is stored in the third storage device connected to the first processing apparatus through the switch device.

8. The non-transitory computer-readable recording medium according to claim 7, the process further comprising:

controlling the switch device such that, after the replicated data piece is stored in the third storage device, the storage device for data replication is disconnected from the first processing apparatus to return to an unused state.

9. The non-transitory computer-readable recording medium according to claim 7, wherein each of the first to third storage devices is a hard disk drive (HDD), and the storage device for data replication is a solid state drive (SSD).

10. The non-transitory computer-readable recording medium according to claim 6, wherein the switch device is a serial attached small computer system interface (SCSI) (SAS) expander, and the process further comprising:

setting the one processing apparatus and the one or more storage devices belonging to each of the plurality of nodes by operating zoning information of the SAS expander.

11. A method for controlling an information processing apparatus executed by a computer, wherein the information processing apparatus includes a plurality of storage devices, a plurality of processing apparatuses, and a switch device that switches a connection status between the plurality of storage devices and the plurality of processing apparatuses, the method comprising:

controlling the switch device and the plurality of processing apparatuses such that, when one of replicated data pieces stored in a first storage device connected to a first processing apparatus among one or more storage devices connected to each of two or more different processing apparatuses among the plurality of processing apparatuses is lost, a third storage device, which is not connected to any of processing apparatuses, is connected to a second processing apparatus connected to a second storage device storing the one of replicated data pieces, and the one of replicated data pieces stored in the second storage device is copied to the third storage device, and the third storage device to which the one of replicated data pieces is copied is connected to the first processing apparatus instead of the first storage device.

* * * * *